US010679578B2

(12) United States Patent
Tanaka et al.

(10) Patent No.: US 10,679,578 B2
(45) Date of Patent: Jun. 9, 2020

(54) DISPLAY DEVICE HAVING DRIVING CIRCUITRY WITH DRIVING GATE LINES

(71) Applicant: SHARP KABUSHIKI KAISHA, Sakai, Osaka (JP)

(72) Inventors: Kohhei Tanaka, Sakai (JP); Kaoru Yamamoto, Sakai (JP); Tokihiro Yokono, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/147,414

(22) Filed: Sep. 28, 2018

(65) Prior Publication Data

US 2019/0096353 A1 Mar. 28, 2019

(30) Foreign Application Priority Data

Sep. 28, 2017 (JP) ................................ 2017-187854

(51) Int. Cl.

| | |
|---|---|
| ***G09G 3/36*** | (2006.01) |
| ***G06F 3/041*** | (2006.01) |
| *G06F 3/044* | (2006.01) |

(52) U.S. Cl.

CPC ......... *G09G 3/3677* (2013.01); *G06F 3/0412* (2013.01); *G06F 3/0416* (2013.01); *G09G 3/3655* (2013.01); *G06F 3/044* (2013.01); *G06F 3/0443* (2019.05); *G09G 2310/0202* (2013.01); *G09G 2310/0286* (2013.01); *G09G 2310/0289* (2013.01); *G09G 2310/08* (2013.01); *G09G 2354/00* (2013.01)

(58) Field of Classification Search

CPC .................................................. G09G 3/3677

USPC ........................................................ 345/214

See application file for complete search history.

(56) References Cited

U.S. PATENT DOCUMENTS

| | | | | |
|---|---|---|---|---|
| 2014/0267156 | A1 | 9/2014 | Koga et al. | |
| 2017/0123556 | A1* | 5/2017 | Lin | G06F 3/0412 |
| 2017/0186373 | A1* | 6/2017 | Nishikawa | G11C 19/28 |
| 2018/0329547 | A1* | 11/2018 | Wu | G11C 19/28 |

FOREIGN PATENT DOCUMENTS

JP 2014-182203 A 9/2014

* cited by examiner

*Primary Examiner* — Long D Pham

(74) *Attorney, Agent, or Firm* — ScienBiziP, P.C.

(57) ABSTRACT

The display device includes drive circuits 301 provided in correspondence to the gate lines, respectively, and alternately switches a scanning period for scanning the gate lines and a non-scanning period during one vertical scanning period. The drive circuit 301 includes netA(n), an output switching element M5 connected to netA(n), and a reset circuit R. The output switching element M5 applies a selection voltage to the gate line GLn. The potential of netA(n) changes between a first potential that is equal to or higher than a threshold voltage of the output switching element M5, and a second potential that is lower than the first potential. In the drive circuit 301 wherein a period while netA(n) thereof has the second potential overlaps with the non-scanning period, the reset circuit R resets the potential of netA(n) to the second potential, before the resumption of the scanning period after the non-scanning period.

8 Claims, 15 Drawing Sheets

301(n)

311

321

DISPLAY DEVICE HAVING DRIVING CIRCUITRY WITH DRIVING GATE LINES

TECHNICAL FIELD

The present invention relates to a display device.

BACKGROUND ART

Patent Document 1 indicated below discloses a display device that alternately performs touch position detection and image display in one frame. This display device scans gate lines with use of shift registers at the respective stages during the image display period, and when the touch position detection period starts, the display device suspends the scanning of the gate lines. In a case where a potential at a high (H) level is held by an internal node, each shift register outputs a scanning signal to the corresponding gate line. In a case where the scanning of the gate lines is suspended in a state in which the internal node of the shift register holds a potential at the H level, the potential of the internal node decreases due to off-leakage current. In this display device, during the touch position detection period, a potential holding signal having a potential at the H level is supplied to transistors connected to the internal node.

PRIOR ART DOCUMENT

Patent Document

Patent Document 1: JP-A-2014-182203

In the configuration disclosed in Patent Document 1, a shift register that should hold the potential at the H level in the internal node during the touch position detection period can hold the potential of the internal node, due to the potential holding signal that has a potential at the H level. During the touch position detection period, however, the potential holding signal at the H level is also supplied to a shift register that should hold a potential at a low (L) level in the internal node thereof. Consequently, the potential of the internal node of the shift register that should hold a potential at L level possibly rises due to leakage current in transistors to which the potential holding signal is supplied. If the image display period is resumed in this state, a gate line that is not supposed to be scanned is scanned.

SUMMARY OF THE INVENTION

In a display device in which the scanning of the gate lines is performed intermittently, the following invention prevents malfunctions from occurring when the scanning of gate lines is resumed.

A display device in one embodiment of the present invention includes a display panel including a plurality of gate lines; and a driving circuitry that includes a plurality of drive circuits that are provided in correspondence to the gate lines, respectively, so as to scan the gate lines sequentially, with use of a driving signal, wherein the driving circuitry alternately switches a scanning period in which the gate lines are scanned, and a non-scanning period in which the scanning of the gate lines is suspended, during one vertical scanning period, wherein each of the drive circuits includes: an output switching element that, during the scanning period, applies a selection voltage to one of the gate lines corresponding thereto, the selection voltage causing this gate line to be switched to a selected state; an internal line connected with a gate electrode of the output switching element; and a reset circuitry connected with the internal line, the internal line has a potential that changes between a first potential that is equal to or higher than a threshold voltage of the output switching element, and a second potential that is lower than the first potential, and in some drive circuits, among the drive circuits, wherein a period while the internal line thereof has the second potential overlaps with the non-scanning period, the reset circuit resets the potential of the internal line to the second potential, before the scanning period after the non-scanning period is resumed.

According to the above configuration, in a display device in which the scanning of the gate lines is performed intermittently, malfunctions upon the resumption of the scanning of gate lines can be prevented from occurring.

MODE FOR CARRYING OUT THE INVENTION

Figure 1:
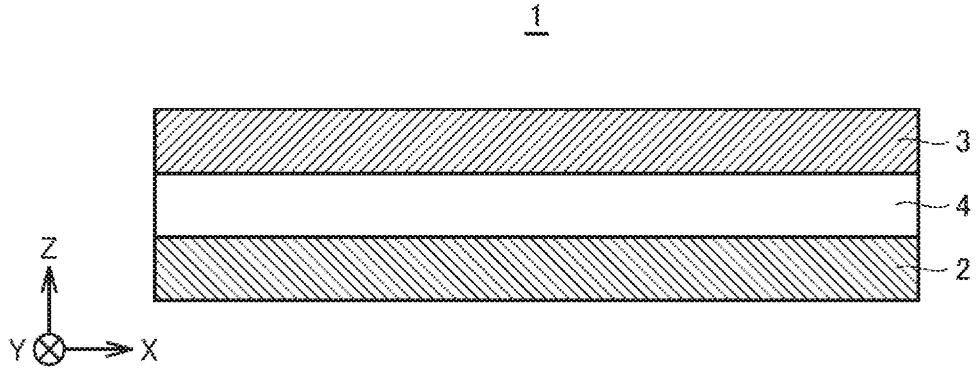
FIG. 1 is a schematic cross-sectional view illustrating a display device in Embodiment 1.

A display device in one embodiment of the present invention includes: a display panel including a plurality of gate lines; and a driving circuitry that includes a plurality of drive circuits that are provided in correspondence to the gate lines, respectively, so as to scan the gate lines sequentially, with use of a driving signal, wherein the driving circuitry alternately switches a scanning period in which the gate lines are scanned, and a non-scanning period in which the scanning of the gate lines is suspended, during one vertical scanning period, wherein each of the drive circuits includes: an output switching element that, during the scanning period, applies a selection voltage to one of the gate lines corresponding thereto, the selection voltage causing this gate line to be switched to a selected state; an internal line connected with a gate electrode of the output switching element; and a reset circuitry connected with the internal line, the internal line has a potential that changes between a first potential that is equal to or higher than a threshold voltage of the output switching element, and a second potential that is lower than the first potential, and in some drive circuits, among the drive circuits, wherein a period while the internal line thereof has the second potential overlaps with the non-scanning period, the reset circuit resets the potential of the internal line to the second potential, before the scanning period after the non-scanning period is resumed. (the first configuration).

According to the first configuration, the potential of the internal line changes between the first potential and the second potential lower than the first potential. The first potential is a potential that is equal to or higher than the threshold voltage of the output switching element. In a case where another switching element is connected to the internal line, an internal line of a drive circuit that has switched the gate line before the non-scanning period, an internal line of a drive circuit that is to switch the gate line to a selected state in the next scanning period, and the like, have potentials increased to a level higher than the second potential during the non-scanning period, due to leakage current in the another switching element. When the potential of the internal line increases to a level equal to or higher than the threshold voltage of the output switching element, the output switching element, which is supposed to be in the OFF state, is turned ON upon the resumption of the scanning period, and causes the gate line to be switched to the selected state at an unintended timing.

In the present configuration, in the drive circuit wherein a period while the internal line thereof has the second potential overlaps with the non-scanning period, the potential of the internal line is reset to the second potential by the reset circuitry before the start of the scanning period after the non-scanning period. Upon the resumption of the scanning period, therefore, the output switching element of the drive circuit does not malfunction, and unintended switching of the gate line to the selected state can be decreased.

The first configuration may be further characterized in that the reset circuitry includes: a first reset switching element connected with the internal line; a second reset switching element connected with the internal line and the first reset switching element; a reset internal line connected with the second reset switching element; and a third reset switching element connected with the reset internal line, wherein the first reset switching element includes a gate electrode connected with the reset internal line, a source electrode connected with the internal line, and a drain electrode to which a control signal is supplied, the control signal having a potential higher than the second potential during a period after the start of the non-scanning period until the resumption of the scanning period after the non-scanning period, and having the second potential during a period other than the foregoing period, the second reset switching element includes a gate electrode connected with the internal line, and causes a potential of the reset internal line to change to a level lower than a threshold voltage of the first reset switching element, at least when the potential of the internal line is equal to or higher than a threshold voltage of the second reset switching element, and before the scanning period is resumed, the third reset switching element causes the potential of the reset internal line to change to a level equal to or higher than the threshold voltage of the first reset switching element (the second configuration).

According to the second configuration, the first reset switching element is in the OFF state when the potential of the internal line is equal to or higher than the threshold voltage of the second reset switching element, and is turned ON before the scanning period is resumed. This makes it possible to cause the potential of the internal line to change to the second potential before the resumption of the scanning period, via the first reset switching element.

The second configuration may be further characterized in that the third reset switching element causes the potential of the reset internal line to change to a level equal to or higher than the threshold voltage of the first reset switching element before the scanning period is resumed, and during a period while the potential of the control signal is the second potential, and the reset circuitry further includes an auxiliary reset circuit, wherein the auxiliary reset circuit includes: a first auxiliary reset switching element that includes a source electrode connected with the internal line, and a drain electrode to which the control signal is supplied; an auxiliary reset internal line connected with a gate electrode of the first auxiliary reset switching element; a second auxiliary reset switching element connected with the internal line and the auxiliary reset internal line; and a third auxiliary reset switching element connected with the auxiliary reset internal line, wherein the second auxiliary reset switching element includes a gate electrode connected with the internal line, and at least when the potential of the internal line is equal to or higher than a threshold voltage of the second auxiliary reset switching element, the second auxiliary reset switching element causes the potential of the auxiliary reset internal line to change to a level lower than a threshold voltage of the first auxiliary reset switching element, and the third auxiliary reset switching element causes the potential of the auxiliary reset internal line to change to a level equal to or higher than the threshold voltage of the first auxiliary reset switching element, only before the scanning period is resumed, after the potential of the control signal changes to the second potential (the third configuration).

According to the third configuration, the reset circuitry includes the reset circuit and auxiliary reset circuit. Since the first reset switching element is turned ON not only before the resumption of the scanning period but also during a period while the control signal has the second potential, the first reset switching element tends to deteriorate. The auxiliary reset internal line of the auxiliary reset circuit has a potential equal to or higher than the threshold voltage of the first auxiliary reset switching element only before the resumption of the scanning period. The first auxiliary reset switching element, therefore, is less frequently turned ON as compared with the first reset switching element, and hardly deteriorates. Consequently, even if the first reset switching element deteriorates, the potential of the internal line of the drive circuit corresponding to the gate line that is switched to the non-selected state can be surely switched to the second potential before the resumption of the scanning period, by the auxiliary reset circuit.

The first configuration may be further characterized in that the reset circuitry includes: a first reset switching element connected with the internal line; a second reset switching element connected with the internal line and the first reset switching element; a reset internal line connected with the second reset switching element; a capacitor formed between the internal line and the reset internal line; and a third reset switching element connected with the reset internal line, wherein the first reset switching element includes a gate electrode connected with the reset internal line, a source electrode connected with the internal line, and a drain electrode to which a control signal is supplied, the control signal having a potential higher than the second potential during a period after the start of the non-scanning period until the resumption of the scanning period after the non-scanning period, and having the second potential during a period other than the foregoing period, the second reset switching element includes a gate electrode connected with the internal line, and causes a potential of the reset internal line to change to a level lower than a threshold voltage of the first reset switching element, at least when the potential of the internal line is equal to or higher than a threshold voltage of the second reset switching element, and before the scanning period is resumed, the third reset switching element causes the potential of the reset internal line to change to a level equal to or higher than the threshold voltage of the first reset switching element (the fourth configuration).

According to the fourth configuration, a capacitor is formed between the internal line and the reset internal line, and the internal line is influenced by the potential change of the reset internal line via the capacitor. When the potential of the reset internal line is lower than the threshold of the first reset switching element, therefore, the internal line of the drive circuit that has switched the gate line to the non-selected state has a further lower potential. As a result, even if the potential of the internal line of the drive circuit that has switched the gate line to the non-selected state increases during the non-scanning period due to leakage current, the potential of the internal line is hardly switched to be equal to or higher than the threshold voltage of the output switching element, whereby the output switching element is hardly turned ON.

The fourth configuration may be further characterized in that the capacitor includes a pair of electrodes, and one of the electrodes of the capacitor is connected with the internal line, and the other electrode thereof is connected to the reset internal line (the fifth configuration).

The first configuration may be further characterized in that the reset circuitry includes: a first reset switching element connected with the internal line; a reset internal line connected with the first reset switching element; a second reset switching element connected with the internal line and the reset internal line; a third reset switching element connected with the reset internal line; and a capacitor connected with the internal line, wherein the first reset switching element includes a gate electrode connected with the reset internal line, a source electrode connected with the internal line, and a drain electrode to which a control signal is supplied, the control signal having a potential higher than the second potential during a period after the start of the non-scanning period until the resumption of the scanning period after the non-scanning period, and having the second potential during a period other than the foregoing period, the second reset switching element includes a gate electrode connected with the internal line, and causes a potential of the reset internal line to change to a level lower than a threshold voltage of the first reset switching element, at least when the potential of the internal line is equal to or higher than a threshold voltage of the second reset switching element, before the scanning period is resumed, the third reset switching element causes the potential of the reset internal line to change to a level equal to or higher than the threshold voltage of the first reset switching element, and the capacitor includes a pair of electrode, one of the electrodes is connected with the internal line, and to the other electrode, a potential higher than the second potential is supplied during the scanning period, and the second potential is supplied during the non-scanning period (the sixth configuration).

According to the sixth configuration, one of the electrodes of the capacitor is connected with the internal line, and a potential higher than the second potential is supplied to the other electrode thereof during the scanning period, and a the second potential is supplied to the other electrode thereof during the non-scanning period. The potential of the internal line, therefore, is influenced by the potential input to the capacitor during the non-scanning period. In other words, a decrease of the potential of the other electrode of the capacitor from the first potential to the second potential during the non-scanning period affects the potential of the internal line of the drive circuit that has switched the gate line to the non-selected state Consequently, even if the potential of the internal line increases due to leakage current, the potential of the internal line hardly increases to or above the threshold voltage of the output switching element, and the output switching element is hardly turned ON.

Any one of the first to sixth configurations may be further characterized in including a control circuit that inputs the driving signal to the drive circuits, wherein the control circuit inputs the driving signal to the drive circuits during the scanning period, and suspends the input of the drive signal to the drive circuits during the non-scanning period (the seventh configuration).

Any one of the first to seventh configurations may be further characterized in that the switching elements used in the drive circuits and the reset circuits include a semiconductor layer formed with an oxide semiconductor (the eighth configuration).

With the eighth configuration, leakage current hardly occurs to the switching elements, as compared with a case where amorphous silicon is used.

The eighth configuration may be further characterized in that the oxide semiconductor contains indium, gallium, zinc, and oxygen (the ninth configuration).

With the ninth configuration, the switching elements have higher electronic mobility, and leakage current hardly occurs, as compared with a case where amorphous silicon is used.

The following description describes embodiments of the invention in detail, while referring to the drawings. Identical or equivalent parts in the drawings are denoted by the same reference numerals, and the descriptions of the same are not repeated. To make the description easy to understand, in the drawings referred to hereinafter, the configurations are simply illustrated or schematically illustrated, or the illustration of a part of constituent members is omitted. Further, the dimension ratios of the constituent members illustrated in the drawings do not necessarily indicate the real dimension ratios.

Embodiment 1

FIG. 1 is a schematic cross-sectional view of a display device in the present embodiment. The display device 1 in the present embodiment includes an active matrix substrate 2, a counter substrate 3, and a liquid crystal layer 4 interposed between the active matrix substrate 2 and the counter substrate 3. Each of the active matrix substrate 2 and the counter substrate 3 includes a glass substrate that is substantially transparent (having high translucency). Further, though the illustration is omitted, the display device 1 includes a backlight that is provided so as to extend in a surface direction of the active matrix substrate 2, on a side opposite to the liquid crystal layer 4 in FIG. 1, and a pair of polarizing plates between which the active matrix substrate 2 and the counter substrate 3 are interposed. Thought the illustration is omitted, the counter substrate 3 includes color filters of three colors of red (R), green (G), and blue (B).

The display device 1 has a function of displaying an image and a function of detecting a position at which a user has touched (a touch position), on the image displayed. This display device 1 is a so-called in-cell type touch panel display device wherein elements necessary for detecting a touch position is provided on the active matrix substrate 2.

Further, in the display device 1, the method for driving liquid crystal molecules contained in the liquid crystal layer 4 is the horizontal electric field driving method. To realize the horizontal electric field driving method, pixel electrodes and counter electrodes (common electrodes) for forming electric fields are formed on the active matrix substrate 2. The following description describes the configuration of the active matrix substrate 2 more specifically.

Figure 2A:
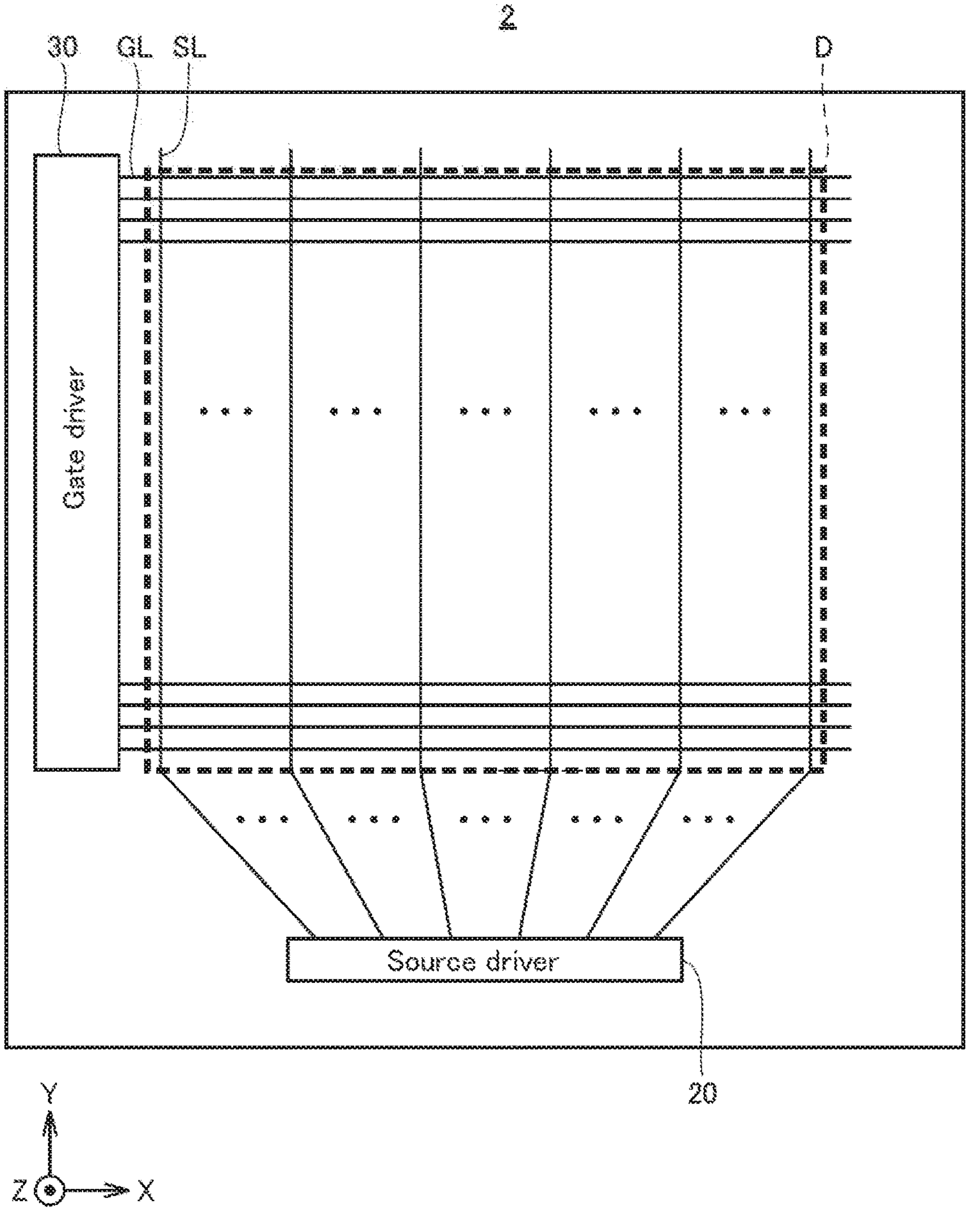
FIG. 2A is a plan view illustrating a schematic configuration of an active matrix substrate illustrated in FIG. 1.

FIG. 2A is a plan view illustrating a schematic configuration of the active matrix substrate 2. As illustrated in FIG. 2A, the active matrix substrate 2 includes a plurality of gate lines GL, a plurality of source lines SL, a source driver 20, and gate drivers 30.

Though the illustration is omitted in this drawing, on the active matrix substrate 2, pixel electrodes are provided in areas defined by the gate lines GL and the source lines SL, respectively, and pixels are formed therein, respectively. The active matrix substrate 2 has a display area D composed of the pixels. Each pixel electrode corresponds to any one of the colors R, G, and B of the color filters (not shown) provided on the counter substrate 3.

Figure 2B:
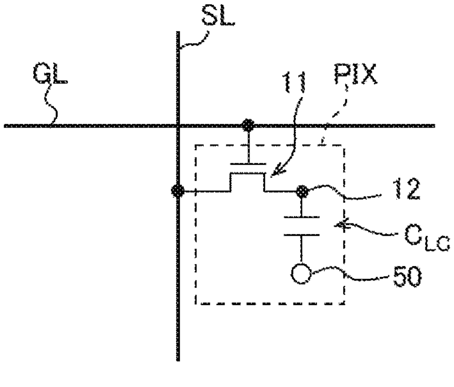
FIG. 2B is an equivalent circuit of one pixel.

FIG. 2B illustrates an equivalent circuit of one pixel. The pixel PIX includes a thin film transistor (TFT) 11, a pixel electrode 12, and a common electrode 50. The gate electrode of the TFT 11 is connected with the gate line GL, the source electrode thereof is connected with the source line SL, and the drain electrode thereof is connected with the pixel electrode 12. A liquid crystal capacitor $C_{LC}$ is formed between the pixel electrode 12 and the counter electrode 50.

As illustrated in FIG. 2A, the source driver 20 and the gate drivers 30 are provided outside the display area D. Though the illustration is omitted in FIG. 2A, the gate drivers 30 have shift registers that are provided so as to correspond to the gate lines GL, respectively.

Each shift register is provided in the vicinity of one of ends of each gate line GL. Each shift register applies a predetermined voltage (hereinafter referred to as a selection voltage) to the gate line GL, so as to switch the gate line GL into the selected state. Hereinafter the state in which the gate line GL is selected is referred to as the scanning or the driving of the gate line GL in some cases.

The source driver 20 is provided in a frame region outside the display area D, on a side of one of ends of the source line SL, and is connected with the source lines SL. The source driver 20 supplies data signals for displaying images to the source lines SL.

Figure 3:
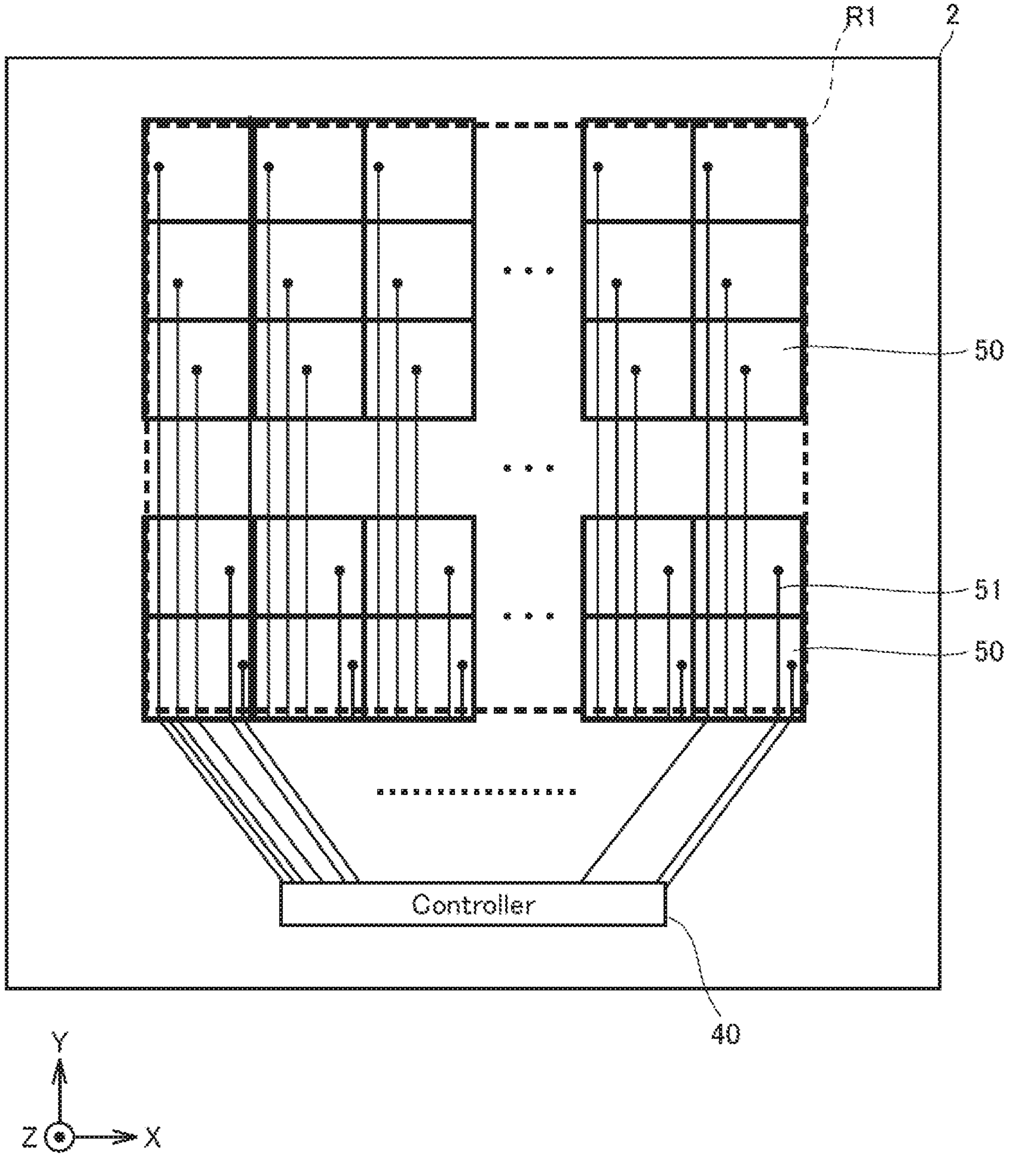
FIG. 3 is a plan view illustrating an exemplary arrangement of counter electrodes formed on the active matrix substrate illustrated in FIG. 2.

FIG. 3 schematically illustrates an exemplary arrangement of the counter electrodes 50 formed on the active matrix substrate 2. As illustrated in FIG. 3, each counter electrode 50 is in a rectangular shape, and a plurality of the same are arranged in matrix on the active matrix substrate 2. The counter electrodes 50 are provided in an upper layer with respect to the pixel electrodes 12, on a the liquid crystal layer 4 side surface (see FIG. 1) of the active matrix substrate 2. Each of the counter electrodes 50 is, for example, approximately in a square shape whose side is several millimeters, and is larger than the pixel. Though the illustration is omitted in this drawing, the counter electrodes 50 has slits (having a width of, for example, several j m) for causing horizontal electric fields to be generated between the same and the pixel electrodes 12.

The active matrix substrate 2 includes a controller 40 on a frame region side where the source driver 20 illustrated in FIG. 2 is provided. The controller 40 performs image display control for displaying images, and performs touch position detection control for detecting a touch position.

The controller 40 and each counter electrode 50 are connected with each other by a signal line 51 that extends in the Y axis direction. In other words, the signal lines 51, the number of which is the same as the number of the counter electrodes 50, are formed on the active matrix substrate 2.

The counter electrodes 50 are used, in pair with the pixel electrodes 12, in the image display control, as well as in the touch position detection control.

Figure 4:
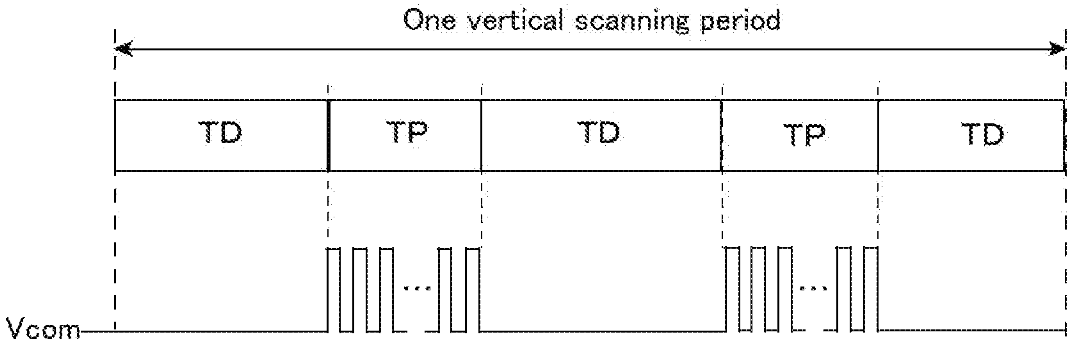
FIG. 4 illustrates voltages of the counter electrodes during an image display period TD and during a touch position detection period TP in one horizontal scanning period.

In the present embodiment, as illustrated in FIG. 4, an image display period TD and a touch position detection period TP are provided alternately a plurality of times during one vertical scanning period.

The controller 40 supplies a constant direct current signal to the signal lines 51 during the image display period TD, so as to cause the counter electrodes 50 to function as common electrodes. Further, during the touch position detection period TP, the controller 40 supplies an alternate current signal having a constant amplitude to the signal lines 51, as a touch driving signal for the detection of a touch position.

Parasitic capacitances are formed between adjacent ones of the counter electrodes 50 and the like. When a human finger or the like touches the display screen of the display device 1, a capacitor is formed between the counter electrodes 50 and the human finger or the like, whereby the electrostatic capacitance increases. During the touch position detection control, the counter electrodes 50 receive the touch driving signal supplied via the signal lines 51, and output changes in the electrostatic capacitances at positions of the counter electrodes 50, via the signal lines 51 to the controller 40.

The gate driver 30 sequentially scan the gate lines GL during the image display period TD, and suspends the scanning of the gate lines GL during the touch position detection period TP. In other words, the image display period TD is a period for the scanning of the gate lines GL, and the touch position detection period TP is a period for the non-scanning of the gate lines GL.

In this example, to each shift register of the gate driver 30, signals for driving denoted by GCK1 to GCK4 to be described below (hereinafter referred to as dock signals), control signals (CLR, VTP1, VTP2), and power source voltage signals (VDD, VSS) are input by the controller 40. The shift register is connected with the terminals to which the signal for driving, the control signal, and the power source voltage signal, respectively.

The clock signals GCK to GCK4 have a potential at a high (H) level and a potential at a low (L) level alternately at every two horizontal scanning periods (2H). The potential at the H level is, for example, the same potential as that of the power source voltage signal VDD, and the potential at the L level is, for example, the same potential as that of the power source voltage signal VSS. The clock signals GCK1 and GCK3 have phases opposite to each other, and so do the clock signals GCK2 and GCK4. Further, the phase of the clock signal GCK1 is shifted from the phases of the clock signals GCK2 and GCK4 for one horizontal scanning period each, and the phase of the clock signal GCK3 is shifted from the phases of the clock signals GCK2 and GCK4 for one horizontal scanning period each. In other words, the clock signals GCK1 to GCK4 are four-phase clock signals having phases shifted from one another.

The control signals denoted by VTP1 and VTP2 (hereinafter referred to as signal VTP1 and signal VTP2, respectively) are signals that have potential fluctuating during the touch position detection period TP. Details of the signal VTP1 and the signal VTP2 are to be described below.

A reset signal CLR is a signal as follows: in one vertical scanning period, the potential thereof is at the H level during two horizontal scanning periods alone, and is at the L level during the other period.

Figure 5A:
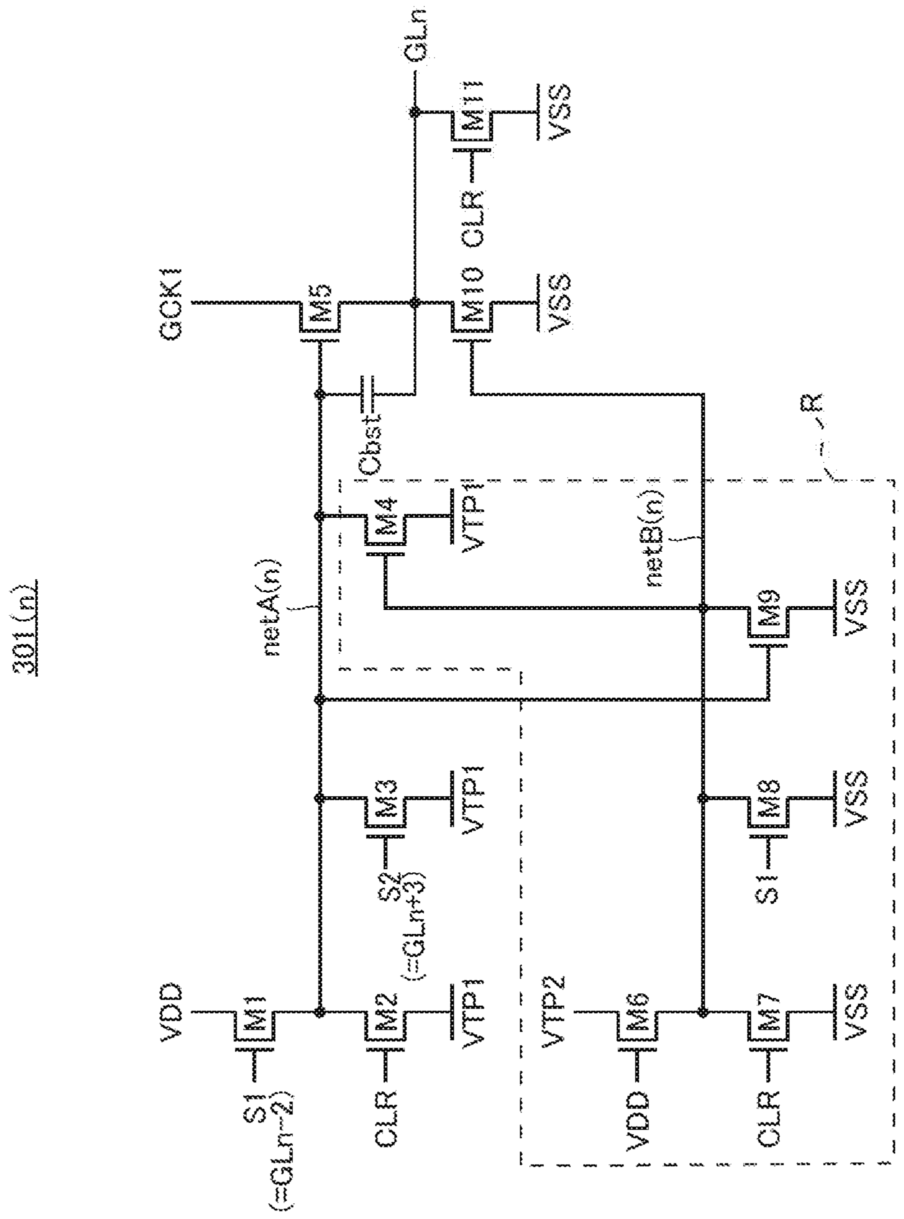
FIG. 5A is an equivalent circuit diagram of a shift register that drives the gate line on the n'th stage in Embodiment 1.

Here, the following description describes the configuration of the shift register of the gate driver 30. FIG. 5A is an equivalent circuit diagram of the shift register that drives the gate line GLn on the n'th stage. In this case, n is an integer equal to or more than 3.

As illustrated in FIG. 5A, the shift register 301(*n*) driving the gate line GLn is formed by connecting TFTs denoted by M1 to M11 and a capacitor Cbst. Hereinafter the TFTs denoted by M1 to M11 are referred to as TFTs_M1 to _M11. The TFTs forming the shift register in the present embodiment are n-channel-type TFTs.

The shift register 301(*n*) includes internal lines denoted by netA(n) and netB(n). netA(n) is an internal line that connects TFTs_M1 to _M5, _M9, and the capacitor Cbst. netB(n) is an internal line that connects TFTs_M4, and _M6 to _M10.

In shift register 301(*n*), TFTs_M4, _M6 to _M9, and netB(n) indicated by a broken line frame R are an exemplary reset circuit that resets the potential of netA(n).

The following description specifically describes the configuration of the shift register 301(*n*).

Regarding TFT_M1, the gate electrode thereof is connected with a terminal S1, the drain electrode thereof is connected with a terminal VDD, and the source electrode thereof is connected with netA(n). To the terminal S1 connected with the shift register 301(*n*), the gate line GLn−2 is connected. To the terminal VDD, the power source voltage signal VDD is supplied.

Regarding TFT_M2, the gate electrode thereof is connected with a terminal CLR, the drain electrode is connected with netA(n), and the source electrode is connected with a terminal VTP1. The reset signal CLR is supplied to the terminal CLR. The signal VTP1 is supplied to the terminal VTP1.

Regarding TFT_M3, the gate electrode thereof is connected with a terminal S2, the drain electrode thereof is connected with netA(n), and the source electrode thereof is connected with the terminal VTP1. The terminal S2 connected with the shift register 301(*n*) is connected with the gate line GLn+3.

Regarding TFT_M4, the gate electrode thereof is connected with netB(n), the drain electrode thereof is connected with netA(n), and the source electrode thereof is connected with the terminal VTP1.

Regarding TFT_M5, the gate electrode thereof is connected with netA(n), the drain electrode thereof is connected with a terminal GCK1, and the source electrode thereof is connected with the gate line GLn. The clock signal GCK1 is supplied to the terminal GCK1.

Regarding TFT_M6, the gate electrode thereof is connected with the terminal VDD, the drain electrode thereof is connected with a terminal VTP2, and the source electrode thereof is connected with netB(n). To the terminal VTP2, the signal VTP2 is supplied.

Regarding TFT_M7, the gate electrode thereof is connected with the terminal CLR, the drain electrode thereof is connected with netB(n), and the source electrode is connected with a terminal VSS. The power source voltage signal VSS is supplied to the terminal VSS.

Regarding TFT_M8, the gate electrode thereof is connected with the terminal S1, the drain electrode thereof is connected with netB(n), and the source electrode is connected with the terminal VSS.

Regarding TFT_M9, the gate electrode thereof is connected with netA(n), the drain electrode thereof is connected with netB(n), and the source electrode thereof is connected with the terminal VSS.

Regarding TFT_M10, the gate electrode thereof is connected with netB(n), the drain electrode thereof is connected with the gate line GLn, and the source electrode thereof is connected with the terminal VSS.

Regarding TFT_M11, the gate electrode thereof is connected with the terminal CLR, the drain electrode thereof is connected with the gate line GLn, and the source electrode thereof is connected with the terminal VSS.

Regarding the capacitor Cbst, one of the electrodes thereof is connected with netA(n), and the other electrode thereof is connected with the gate line GLn.

FIG. 5A illustrates an example of the shift register 301(*n*) that drives the gate line GLn, and another shift register 301 that drives the gate line GL of another stage has an identical configuration. The clock signal supplied to the shift register 301, and the gate lines GL connected to the terminal S1 and the terminal S2 connected with the shift register 301 are different, depending on the gate line GL that the shift register 301 drives. The following description specifically describes this.

To the shift register 301 of each stage, one clock signal among the four-phase clock signals GCK1 to GCK4 is supplied, and the same clock signal is supplied to a shift register 301 that is four stages behind or ahead with respect to the foregoing shift register 301. For example, in this example, the clock signal GCK1 is supplied to the shift registers 301(*n*), 301(*n*−4), and 301(*n*+4). The clock signal GCK2 is supplied to the shift registers 301(*n*+1), 301(*n*−3), and 301(*n*+5). The clock signal GCK3 is supplied to the shift registers 301(*n*+2), 301(*n*−2), and 301(*n*+6). The clock signal GCK4 is supplied to the shift registers 301(*n*+3), 301(*n*−1), and 301(*n*+7).

Figure 5B:
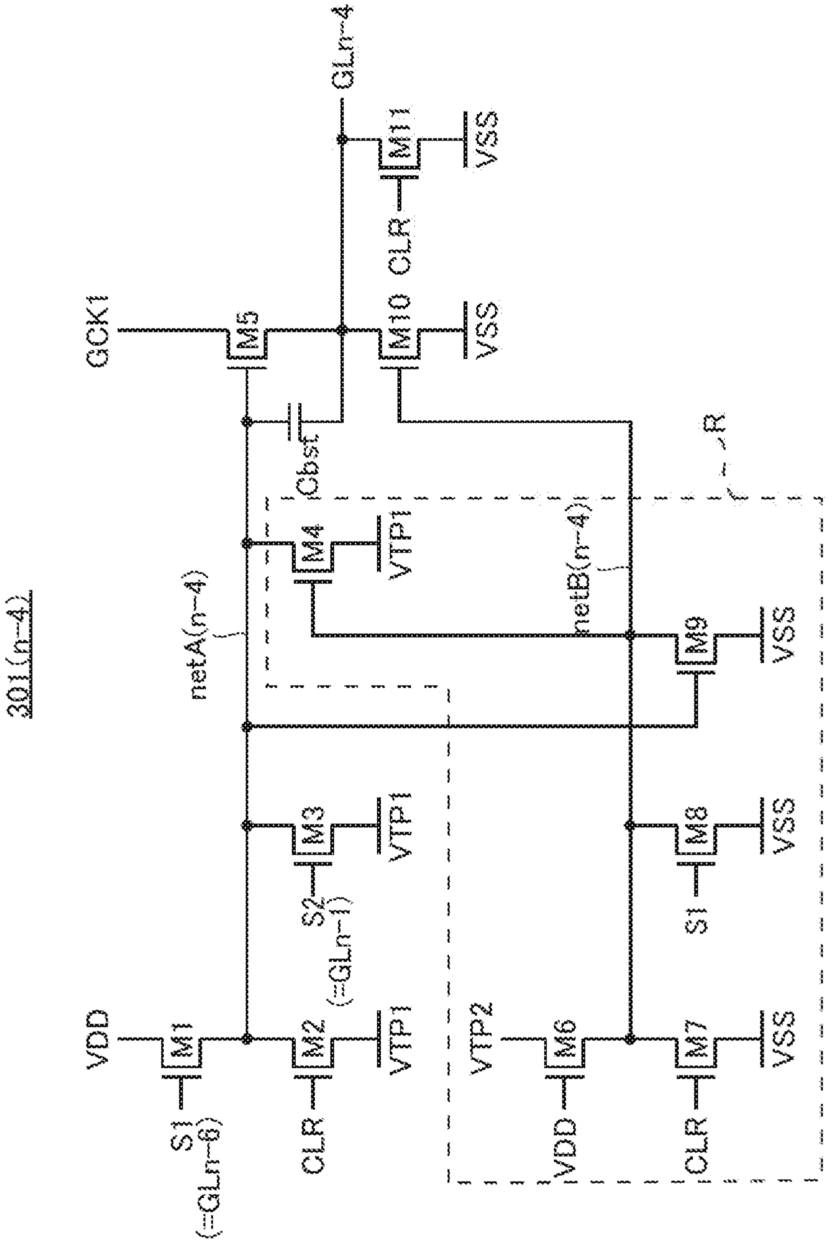
FIG. 5B is an equivalent circuit diagram of a shift register that drives the gate line on the n−4'th stage in Embodiment 1.

The respective gate lines GL connected to the terminal S1 and the terminal S2 to which the shift register 301 is connected are a gate line GL which is located two lines ahead from a gate line GL that the shift register 301 drives, and a gate line GL, which is located at three lines behind from a gate line GL that the shift register 301 drives, respectively. For example, FIG. 5B illustrates a case of the shift register 301(*n*−4) to which the clock signal GCK1 is supplied, and that drives the gate line GLn−4, as is the case with the shift register 301(*n*). As illustrated in FIG. 5B, in the case of the shift register 301(*n*−4), the gate line GLn−6, which is located two stages ahead from the gate line GLn−4, is connected to the terminal S1, and the gate line GLn−1, which is located three stages behind from the gate line GLn−4, is connected to the terminal S2.

Figure 6:
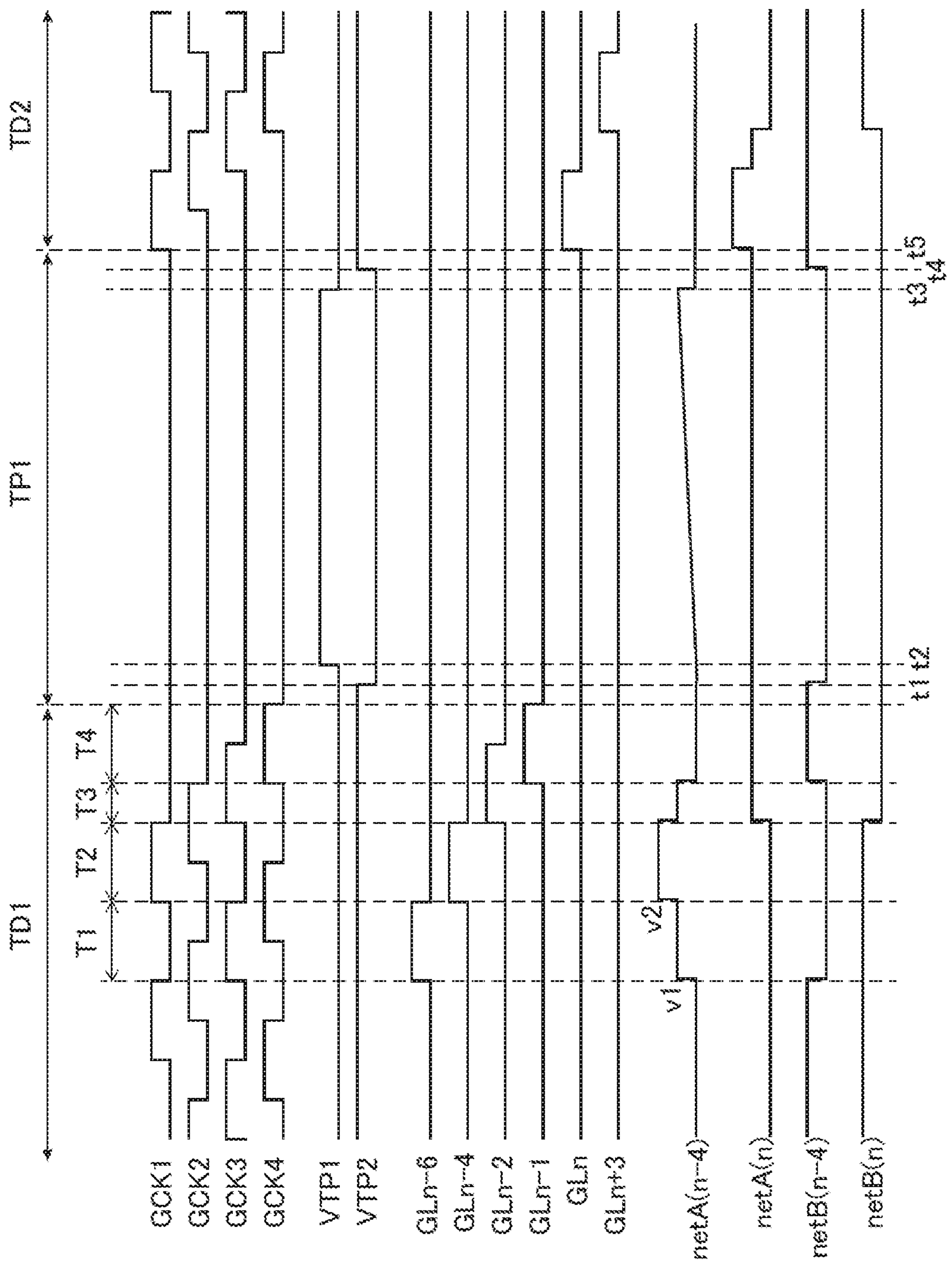
FIG. 6 is a timing chart when the shift registers illustrated in FIGS. 5A and 5B perform the driving.

Here, operations of the shift register 301 are described. FIG. 6 is a timing chart when the shift register 301(*n*−4) and the shift register 301(*n*) drive respective ones of the gate lines GL.

FIG. 6 illustrates an example in which the gate lines GLn−6 to GLn−1 are driven during the image display period TD1, the touch position detection period TP1 starts before the gate line GLn is driven, and the gate line GLn is driven at the start of the next image display period, i.e., the image display period TD2. Though the illustration of the signal CLR is omitted in FIG. 6, the signal CLR has a potential at the H level, for example, during only one horizontal scanning period in each vertical scanning period, and has a potential at the L level during the rest of the period.

First, the following description focuses on operations of the shift register 301(*n*−4) (see FIG. 5B). In the period T1 in the image display period TD1, the selection voltage at the H level is applied to the gate line GLn−6, thereby causing the gate line GLn−6 to be switched to the selected state. At this time, TFT_M1 and TFT_M8 of the shift register 301(*n*−4) are turned ON, and TFTs_M2 to _M4, TFT_M7, and TFTs_M9 to M11 are OFF.

TFT_M6 is in the ON state, and the signal VTP2 has a potential at the H level, but since TFT_M8 is in the ON state, netB(n−4) has a potential at the L level via TFT_M8. Further, netA(n−4) is precharged via TFT_M1 so as to have a potential V1 (=VDD−Vth (Vth: threshold voltage of TFT_M1)).

As netA(n−4) is precharged, TFT_M5 and TFT_M9 are turned ON. At this time, since the clock signal GCK1 is at the L level, the gate line GLn−4 maintains a potential at the L level, and netB(n−4) also maintains a potential at the L level.

Next, in the period T2, the gate line GLn−6 has a potential at the L level (in the non-selected state), and the potential of the clock signal GCK1 rises to the H level. At this time, TFT_M1 and TFT_M8 are turned OFF.

TFT_M5 is in the ON state, and a potential at the H level is input via TFT_M5, whereby netA(n−4) is boosted up via the capacitor Cbst to a potential V2, which is higher than the potential V1. This causes the potential at the H level to be input via TFT_M5 to the gate line GLn−4, thereby causing the gate line GLn−4 to be switched to the selected state. Further, since TFT_M9 is in the ON state, netB(n−4) keeps the potential at the L level.

At this time, the potential at the H level of the gate line GLn−4 is input to the gate electrodes of TFT_M1 and TFT_M8 of the shift register 301(*n*−2), whereby netA(n−2) of the shift register 301(*n*−2) is precharged so as to have the potential V1.

Next, in the period T3, the potential of the clock signal GCK1 changes to the L level. This causes the potential of netA(n−4) to decrease to the potential V1 via the capacitor Cbst. The potential of the gate line GLn−4 changes to the L level via TFT_M5, whereby the gate line GLn−4 is switched to the non-selected state.

Further, in the period T3, the potential of the clock signal GCK3 changes to the H level. Though the illustration is omitted, the potential at the H level of the clock signal GCK3 boosts up the potential of netA(n−2) of the shift register 301(*n*−2) to the potential V2, which is higher than the potential V1, which causes the gate line GLn−2 to be switched to the selected state.

In the period T4, the potential of the clock signal GCK4 rises to the H level, thereby causing the gate line GLn−1 to be switched to the selected state. This causes TFT_M3 of the shift register 301(*n*−4) to be turned ON, whereby the potential of netA(n−4) changes to the L level via TFT_M3.

The potential of netA(n−4) changes to the L level, thereby causing TFT_M9 to be turned OFF. Since the signal VTP2 has a potential at the H level at this time, the potential of netB(n−4) changes to the potential of VDD−Vth6 (Vth6: threshold voltage of TFT_M6) via TFT_M6. At this time, TFT_M4 is turned ON, and netA(n−4) maintains the potential at the L level.

After this, the touch position detection period TP1 starts. During the touch position detection period TP1, the potentials of the clock signals GCK1 to GCK4 change to the L level. After the start of the touch position detection period TP1, at time t1, the potential of the signal VTP2 changes to the L level. After time t1, at time t2, the potential of the signal VTP1 changes to the H level.

When the signal VTP2 changes to the L level at time t1, the potential of netB(n−4) changes to the L level via TFT_M6.

In the touch position detection period TP, TFTs_M2 to _M4 are in the OFF state, at time t2 and subsequently, the potential of the signal VTP1 is at the H level. When leakage current flows in the source-drain of TFTs_M2 to _M4, the potential of netA(n−4) rises from the L level via these TFTs.

Subsequently, at time t3, the potential of the signal VTP1 changes to the L level, and at time t4 before the start of the next image display period TD2, the potential of the signal VTP2 changes to the H level.

At this time, TFTs_M7 to _M9 are in the OFF state. The potential of netB(n−4) changes to the potential of VDD−Vth6 via TFT_M6, and TFTs_M4 and _M10 are turned ON. As a result, netA(n−4) has a potential at the L level via TFT_M4, and the gate line GLn−4 keeps the potential at the L level, via TFT_M10.

In other words, after the start of the touch position detection period TP1, before the start of the image display period TD2, the potential of the signal VTP2 rises to the H level, and the potential of netB(n−4) changes to the H level. As a result, TFT_M4 is turned ON, and the potential of netA(n−4) is reset via TFT_M4 to the L level.

Subsequently, at time t5, the image display period TD2 starts again. Consequently, the clock signals GCK1 to GCK4, whose potentials are alternately at the H level and at the L level every two horizontal scanning periods, is supplied from the controller 40 to each shift register 301. At this time, since the potential of netA(n−4) is at the L level, TFT_M5 keeps the OFF state, and the gate line GLn−4 keeps the non-selected state.

Exemplary operations of the shift register 301(*n*−4) are as described above. As described above, in a case where the gate line GL is switched to the non-selected state before the start of the touch position detection period TP, netA(n−4) of the shift register 301 corresponding to the foregoing gate line GL is forcibly reset to the L level via TFT_M4, before the start of the image display period TD2. Consequently, even if the potential of netA(n−4) rises to the threshold voltage of TFT_M5 due to leakage current in TFT_M2 to TFT_M4 during the touch position detection period TP, TFT_M5 is turned OFF at the start of the image display period TD2, and the gate line GLn−4 can be maintained in the non-selected state.

Next, while referring to FIGS. 5A and 6, the following description describes exemplary operations of the shift register 301(*n*). As described above, in the example illustrate in FIG. 6, it is assumed that the scanning is completed up to the gate line GLn−1 in the image display period TD1.

netA(n) of the shift register 301(*n*) is precharged to the potential V1 via TFT_M1 at the timing of the start of the period T3 while the gate line GLn−2 which is located two stages ahead from the gate line GLn is driven. Further, at this timing, the potential of netB(n) changes to the L level.

Subsequently, in the state where netA(n) is precharged, the touch position detection period TP starts. At the time when the touch position detection period TP1 starts, netB(n) has a potential at the L level, and netA(n) has a potential of VDD−Vth1.

After the start of the touch position detection period TP1, at time t1, the signal VTP2 has a potential at the L level, and therefore, netB(n) maintains the potential at the L level during the touch position detection period TP1.

Further, since the gate line GLn+3 is in the non-selected state at the start of the touch position detection period TP1, TFTs_M2 to _M4 are in the OFF state. At time t2, since the potential of the signal VTP1 changes to the H level, leakage current which occurs in each source-drain of TFTs_M2 to _M4 is decreased, and the potential of netA(n) is maintained.

Subsequently, at time t3, the potential of the signal VTP1 changes to the L level, and at time t4, the potential of the signal VTP2 changes to the H level, then, at time t5, the image display period TD2 starts.

At the start of the image display period TD2, the clock signal GCK1 having a potential at the H level is input, and the potential of netA(n) is boosted up to a level higher than the potential V1, via the capacitor Cbst. Consequently, the potential of the gate line GLn changes to the H level via TFT_M5, whereby the gate line GLn is switched to the selected state.

Subsequently, when the gate line GLn+3 is driven by the shift register 301(*n*+3), TFT_M3 is turned ON, and the potential of netA(n) changes to the L level via TFT_M3. When the potential of netA(n) changes to the L level, since TFTs_M7 to _M9 are in the OFF state, the potential of netB(n) changes to VDD−Vth6 via TFT_M6.

In this way, the signal VTP1 having a potential at the H level is input to the drain electrodes of TFTs_M2 to _M4 connected to netA(n) during a certain period after the start of the touch position detection period TP till the start of the next image display period TD. Consequently, leakage current in TFTs_M2 to _M4 is decreased during the touch position detection period TP, whereby the potential of netA(n), which is precharged, is maintained. As a result, at the start of the image display period TD, the potential of netA(n) is boosted up to a level equal to or higher than that at the precharging, whereby an appropriate selection voltage can be applied to the gate line GLn.

In the above-described embodiment, during the touch position detection period TP, the timing at which the potential of the signal VTP2 changes to the L level is earlier than the timing at which the potential of the signal VTP1 changes to the H level; however, this timing may be appropriately the same as the timing at which the potential of the signal VTP1 changes to the H level.

Further, the above-described embodiment is described with reference to an exemplary case where the H-level potential of the signal VTP1 is equal to that of the power source voltage signal VDD, but it may be a positive potential lower than the power source voltage signal VDD. With such a configuration, leakage current can be decreased.

Embodiment 2

Figure 7:
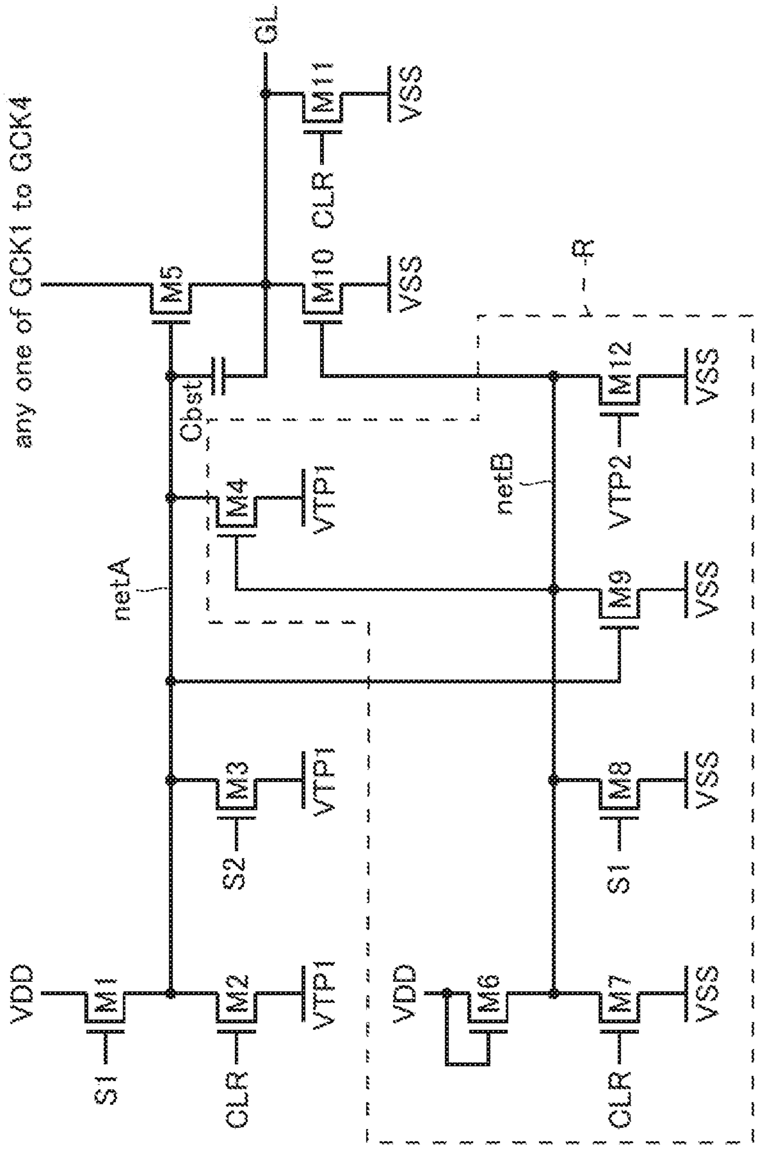
FIG. 7 is an equivalent circuit diagram of a shift register in Embodiment 2.

FIG. 7 is an equivalent circuit diagram of a shift register in the present embodiment. In FIG. 7, the same constituent members of the shift register 301 in Embodiment 1 are denoted by the same reference symbols as those in Embodiment 1. The following description describes constituent members different from those in Embodiment 1.

As illustrated in FIG. 7, the gate electrode and the drain electrode of TFT_M6 of a shift register 311 are connected to the terminal VDD.

Further, the shift register 311 includes a TFT denoted by M12 (hereinafter referred to as TFT_M12) in addition to TFTs_M1 to _M11.

Regarding TFT_M12, the gate electrode thereof is connected with the terminal VTP2, the drain electrode thereof is connected with netB, and the source electrode thereof is connected with the terminal VSS.

Figure 8:
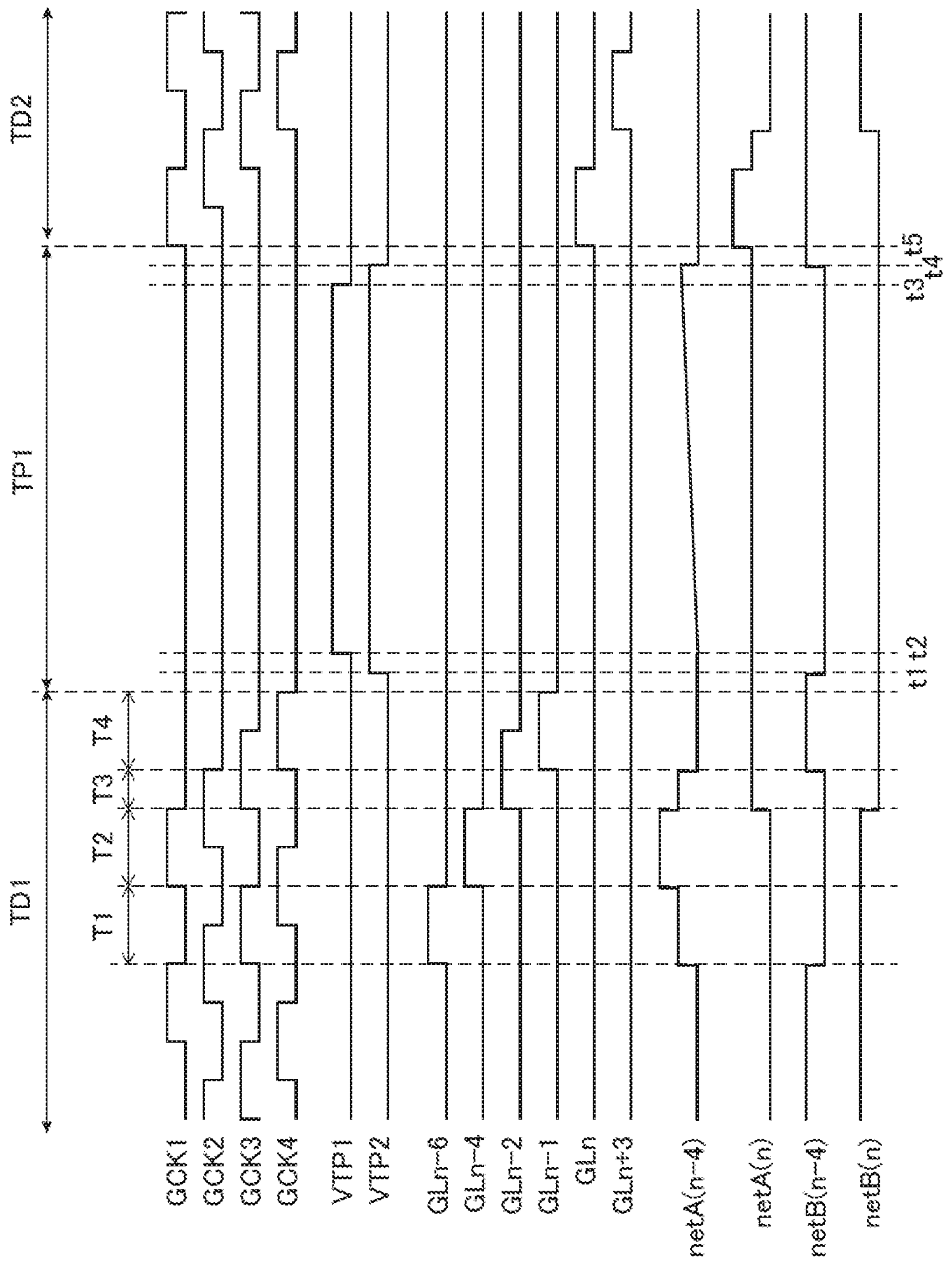
FIG. 8 is a timing chart when the shift register illustrated in FIG. 7 performs the driving.

FIG. 8 is a timing chart when the shift register 311 in the present embodiment is driven. The waveforms in the timing chart of FIG. 8, except for the waveform of the signal VTP2, are identical to those in the timing chart of Embodiment 1 (see FIG. 6).

As illustrated in FIG. 8, the potential of the signal VTP2 in the present embodiment is at the L level during a certain period after the start of the touch position detection period TP1 before the start of the image display period TD2, and is in the H level during the period other than the foregoing period. In other words, the signal VTP2 in the present embodiment has phases opposite to those of the signal VTP2 in Embodiment 1.

TFT_M12 is turned ON, after the start of the touch position detection period TP1, at time t1 when the potential of the signal VTP2 changes to the H level. Thus, in the present embodiment, the potential of netB(n−4) changes to the L level via TFT_M12 during a period from time t1 to time t4, during the touch position detection period TP1.

Subsequently, before the start of the image display period TD2, at time t4, the potential of the signal VTP2 changes to the L level, and TFT_M12 is turned OFF. After the start of the image display period TD2, since TFTs_M7, _M8, _M9, and _M12 of the shift register 311(*n*−4) are in the OFF state, the potential of netB(n−4) changes to VDD−Vth6 via TFT_M6.

Embodiment 3

In Embodiment 1 described above, TFTs_M4, _M6 to _M9, and netB of the shift register 301 function as a reset circuit that resets the potential of netA before the resumption of the image display period TD. The potential of netB is at the H level throughout the image display period TD except for a period while the potential of netA is at the H level. Since TFT_M4 is turned ON when the potential of netB is at the H level, TFT_M4 deteriorates easily. When the threshold voltage changes due to the deterioration of TFT_M4, there is possibility that the potential of netA is not appropriately reset, and the gate line GL, which is supposed to maintain the non-selected state, could be switched to the selected state. The following description of the present embodiment describes a configuration of a shift register having higher reliability than that in Embodiment 1.

Figure 9:
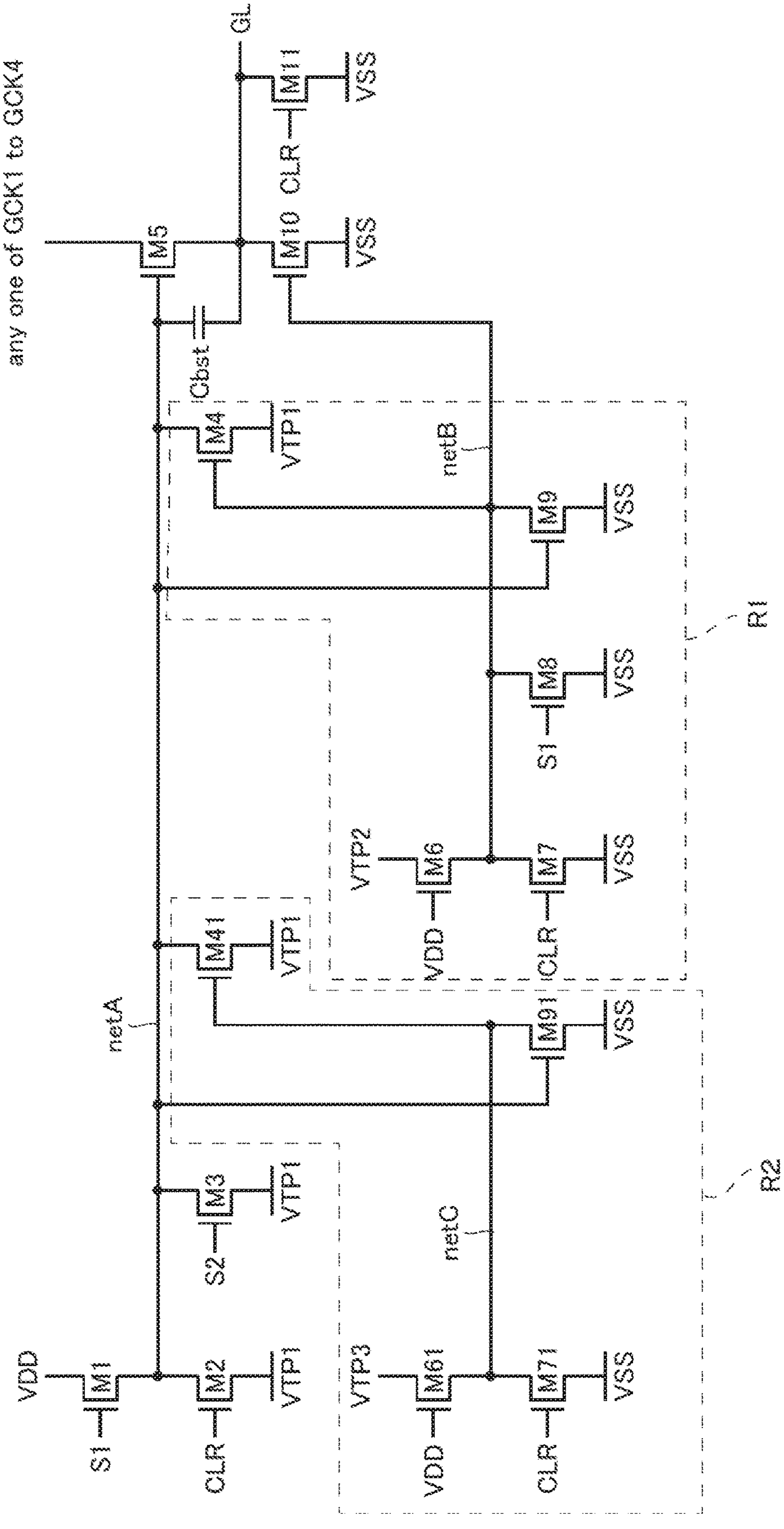
FIG. 9 is an equivalent circuit diagram of a shift register in Embodiment 3.

FIG. 9 is an equivalent circuit diagram of a shift register in the present embodiment. In FIG. 9, the same constituent members of the shift register 301 in Embodiment 1 are denoted by the same reference symbols as those in Embodiment 1. The following description describes constituent members different from those in Embodiment 1.

A shift register 321 includes a reset circuit (auxiliary reset circuit) indicated by a broken line frame R2, in addition to a reset circuit indicated by a broken line frame R1, which is identical to the reset circuit in Embodiment 1. Hereinafter the reset circuit indicated by the broken line frame R1 is referred to as a reset circuit R1, and the reset circuit indicated by the broken line frame R2 is referred to as a reset circuit R2.

The reset circuit R2 includes TFTs_M41, _M61, _M71, and _M91, as well as netC, which is an internal line that connects these TFTs. Each TFT composing the reset circuit R2 is formed with an n-channel-type TFT, as is the case with the reset circuit R1.

The connection of the terminals of TFTs_ M41, _M61, _M71, and _M91 in the reset circuit R2 is identical to the connection of the terminals of TFTs_ M4, _M6, _M7, and _M9 of the reset circuit R1, except for the following points. The following description describes differences of the reset circuit R2 from the reset circuit R1.

While the gate electrode of TFT_M4 is connected with netB, the gate electrode of TFT_M41 is connected with netC.

While the drain electrode of TFT_M6 is connected with the terminal VTP2, the drain electrode of TFT_M61 is connected with a terminal VTP3 to which a signal VTP3 is supplied. The signal VTP3 is input from the controller 40, as is the case with the signal VTP2.

While the drain electrode of TFT_M7 is connected with netB, the drain electrode of TFT_M71 is connected with netC.

While the drain electrode of TFT_M9 is connected with netB, the drain electrode of TFT_M91 is connected with netC.

Figure 10:
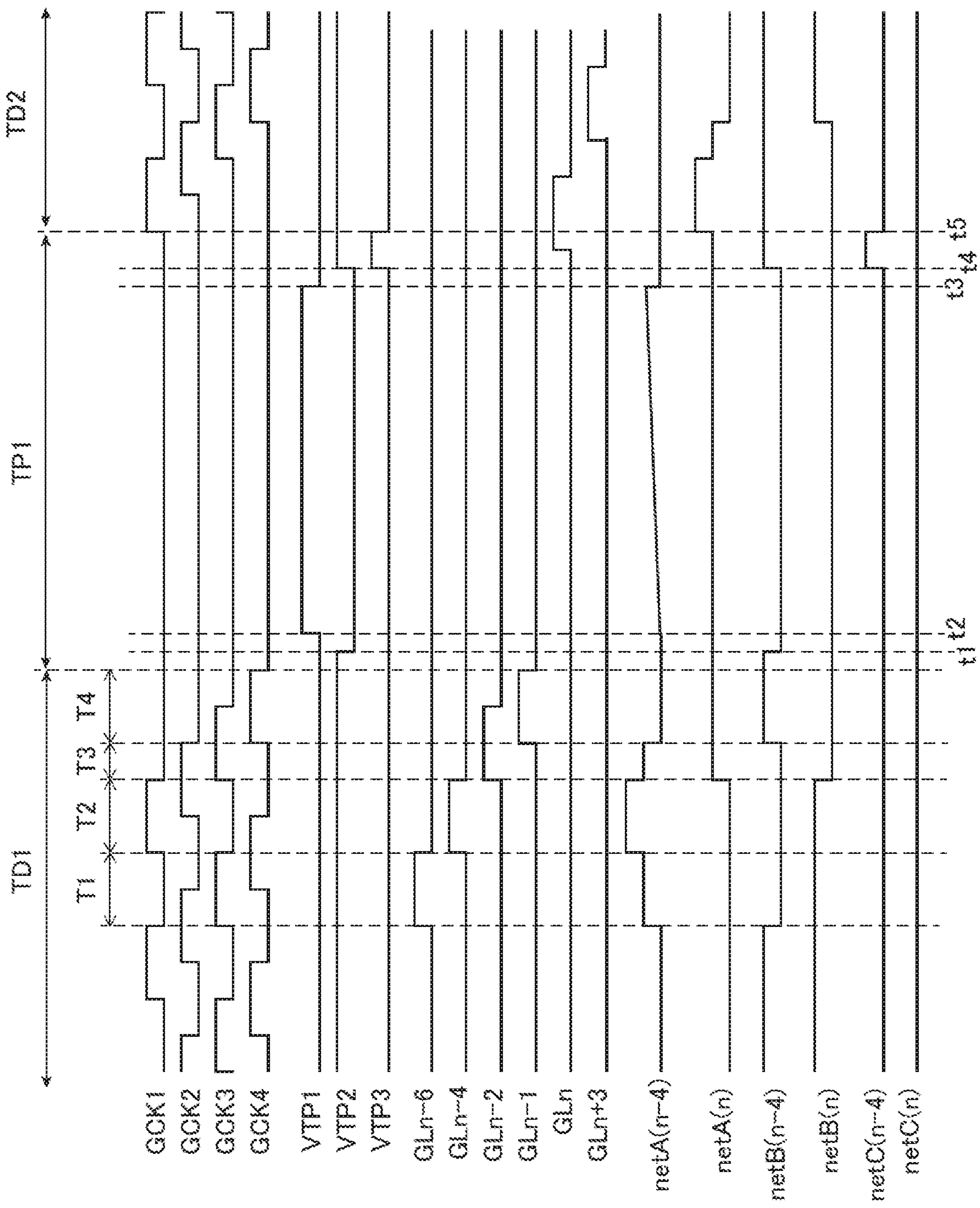
FIG. 10 is a timing chart when the shift register illustrated in FIG. 9 performs the driving.

FIG. 10 is a timing chart when the shift registers 321(*n*−4) and 321(*n*) corresponding to the gate lines GLn−4 and GLn, respectively, are driven.

The timing chart illustrated in FIG. 10 is identical to the timing chart of Embodiment 1 (see FIG. 6) except that the waveforms of the signal VTP3, netC(n−4), and netC(n) are added. NetC(n−4) is an internal line of the reset circuit R2 of the shift register 321(*n*−4), and netC(n) is an internal line of the reset circuit R2 of the shift register 321(*n*).

The following description mainly describes operations of the reset circuit R2 of the shift register 321(*n*−4).

As illustrated in FIG. 10, the signal VTP3 has a potential at the H level only during one horizontal scanning period after the touch position detection period TP1, before the image display period TD2 starts. In other words, the signal VTP3 has a potential at the H level only for a certain period after the touch position detection period TP, before the start of the next image display period TD, and has the potential at the L level during a period other than that.

NetC(n−4) of the reset circuit R2 has a potential at the H level, via TFT_M61, during a period from time t4 to time t5 while the potential of the signal VTP3 is at the H level, and maintains a potential at the L level during a period other than that.

When the potential of netC(n−4) is switched to the H level, TFT_M41 is turned ON. At this time, the potential of netB(n−4) is switched to the H level, and TFT_M4 is also turned ON. From time t4 to time t5, the signal VTP1 has a potential at the L level. As a result, the potential of netA (n−4) changes to the L level via TFT-M4, and additionally, TFT_M41.

In Embodiment 3 described above, the turn-on voltage is applied to TFT_M41 of the reset circuit R2 only when the potential of netC(n−4) is at the H level, in other words, only during one horizontal scanning period before the start of the next image display period TD. Consequently, TFT_M41 does not tend to deteriorate easily, as compared with TFT_M4. This makes it possible to surely reset the potential of netA(n−4) to the L level before the start of the next image display period TD, even if TFT_M4 deteriorates.

Embodiment 4

Figure 11:
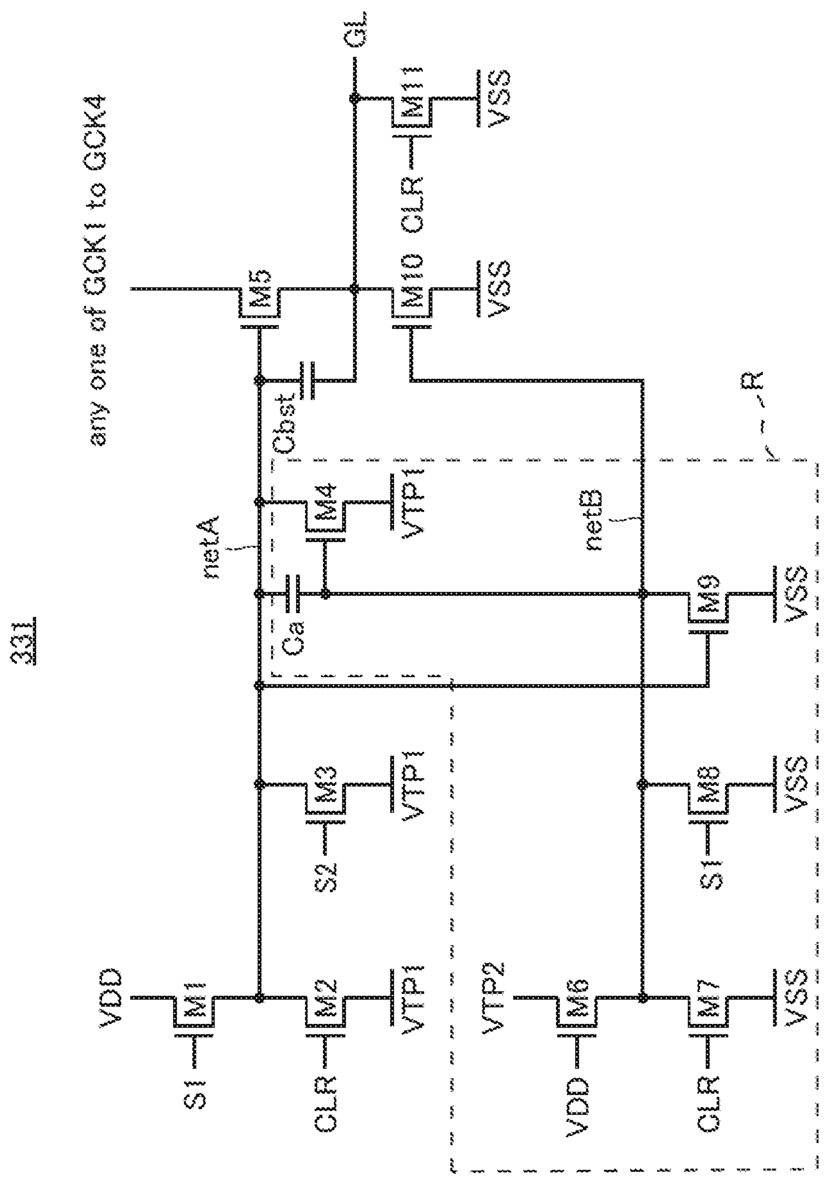
FIG. 11 is an equivalent circuit diagram of a shift register in Embodiment 4.

FIG. 11 is an equivalent circuit diagram of a shift register in the present embodiment. In FIG. 11, the same constituent members of the shift register 301 in Embodiment 1 are denoted by the same reference symbols as those in Embodiment 1. The following description describes constituent members different from those in Embodiment 1.

As illustrated in FIG. 11, a shift register 331 of the present embodiment includes a capacitor Ca between netA and netB, in addition to constituent members identical to those of the shift register 301 of Embodiment 1. In other words, one of electrodes of the capacitor Ca is connected with netA of the shift register 331, and the other electrode of it is connected with netB of the shift register 331.

Figure 12:
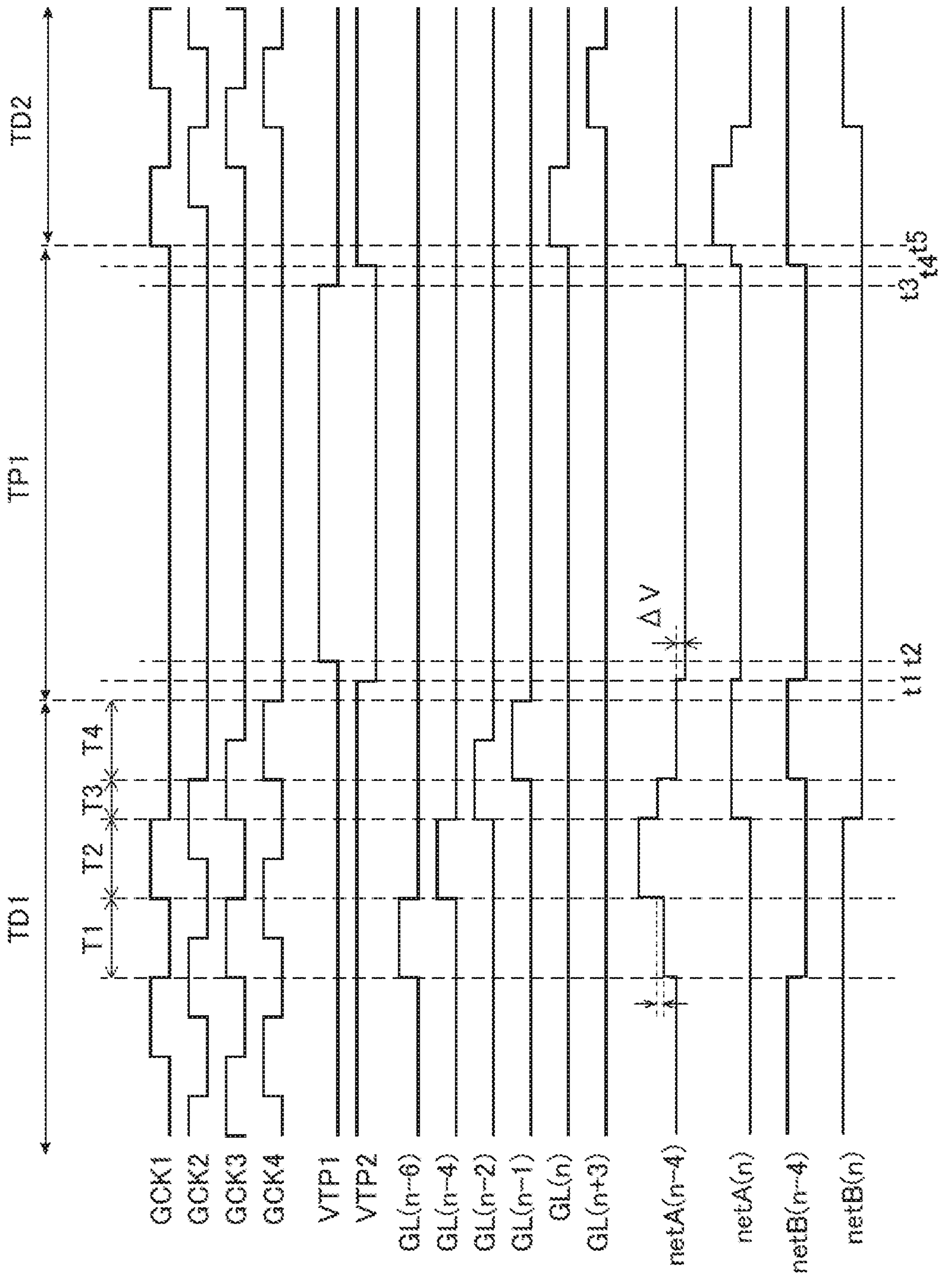
FIG. 12 is a timing chart when the shift register illustrated in FIG. 11 performs the driving.

FIG. 12 is a timing chart when the shift registers 331(*n*−4) and 331(*n*) corresponding to the gate lines GLn−4 and GLn, respectively, are driven. The following description mainly describes points different from those of the timing chart (FIG. 6) of Embodiment 1, regarding operations of the shift register 331(*n*−4).

As illustrated in FIG. 12, in the present embodiment, the potential of netA(n−4) of the shift register 331(*n*−4) is switched to a potential that is only ΔV lower than the L level at the start of the touch position detection period TP1. Further, in the period T1 in the image display period TD1, when netA(n−4) is precharged, the precharging is influenced by the potential change of netB(n), thereby to be inhibited. In other words, when the potential of netB(n−4) changes to the L level, the potential of netA(n−4) tends to decrease via the capacitor Ca.

Consequently, even if the potential of netA(n−4) increases due to off-leakage current in TFTs_M2 to _M4 during the touch position detection period TP1, the potential of netA (n−4) still has ΔV to go, before becoming the threshold voltage of TFT_M5, as compared with Embodiment 1. And thus, during the touch position detection period TP1, a turn-on voltage is hardly applied to TFT_M5, and TFT_M5 hardly deteriorates. As a result, at the start of the image display period TD2, malfunctions of TFT_M5 do not cause the gate line GLn−4 to be driven, and this makes it possible to improve the reliability of the driving of the gate lines GL as compared with Embodiment 1.

Incidentally, the magnitude of ΔV may be greater than a threshold voltage of at least any one of TFTs_M1 to _M4. When ΔV is equal to the magnitude of the threshold voltage of these TFTs, the connection between the gate and the source of the TFT is diode connection, and electric current does not go through the TFT, whereby an increase in the potential of netA can be decreased.

Embodiment 5

In Embodiment 4 described above, when netA(n−4) is precharged during the image display period TD, the precharging of netA is inhibited via the capacitor Ca as the potential of netB(n−4) decreases. The inhibition of the precharging of netA(n−4) possibly leads to the following problem: when the gate line GLn−4 is to be driven, the potential of netA(n−4) cannot be boosted to a level higher than (VDD−Vth1), which causes the driving of the gate line GLn−4 to fail. The present embodiment is described below with reference to an exemplary configuration of a shift register that more surely drives the gate lines GL, while the deterioration of TFT_M5 is decreased, as compared with Embodiment 4.

Figure 13:
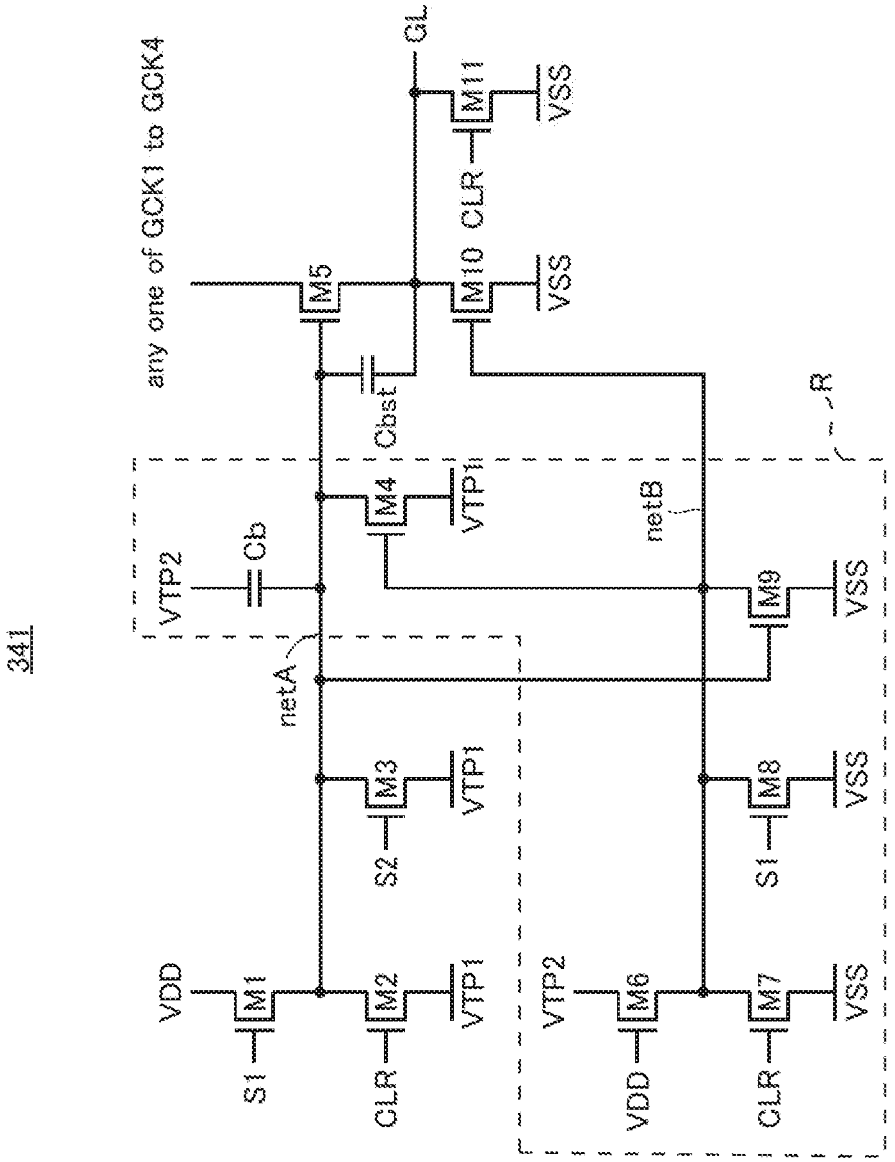
FIG. 13 is an equivalent circuit diagram of a shift register in Embodiment 5.

FIG. 13 is an equivalent circuit diagram of a shift register in the present embodiment. In FIG. 13, the same constituent members of the shift register 331 in Embodiment 4 are denoted by the same reference symbols as those in Embodiment 4. The following description describes constituent members different from those in Embodiment 4.

As illustrated in FIG. 13, a shift register 341 in the present embodiment includes a capacitor Cb in place of the capacitor Ca. Regarding the capacitor Cb, one of electrodes of it is connected with netA of the shift register 341, and the other electrode of it is connected with the terminal VTP2.

Figure 14:
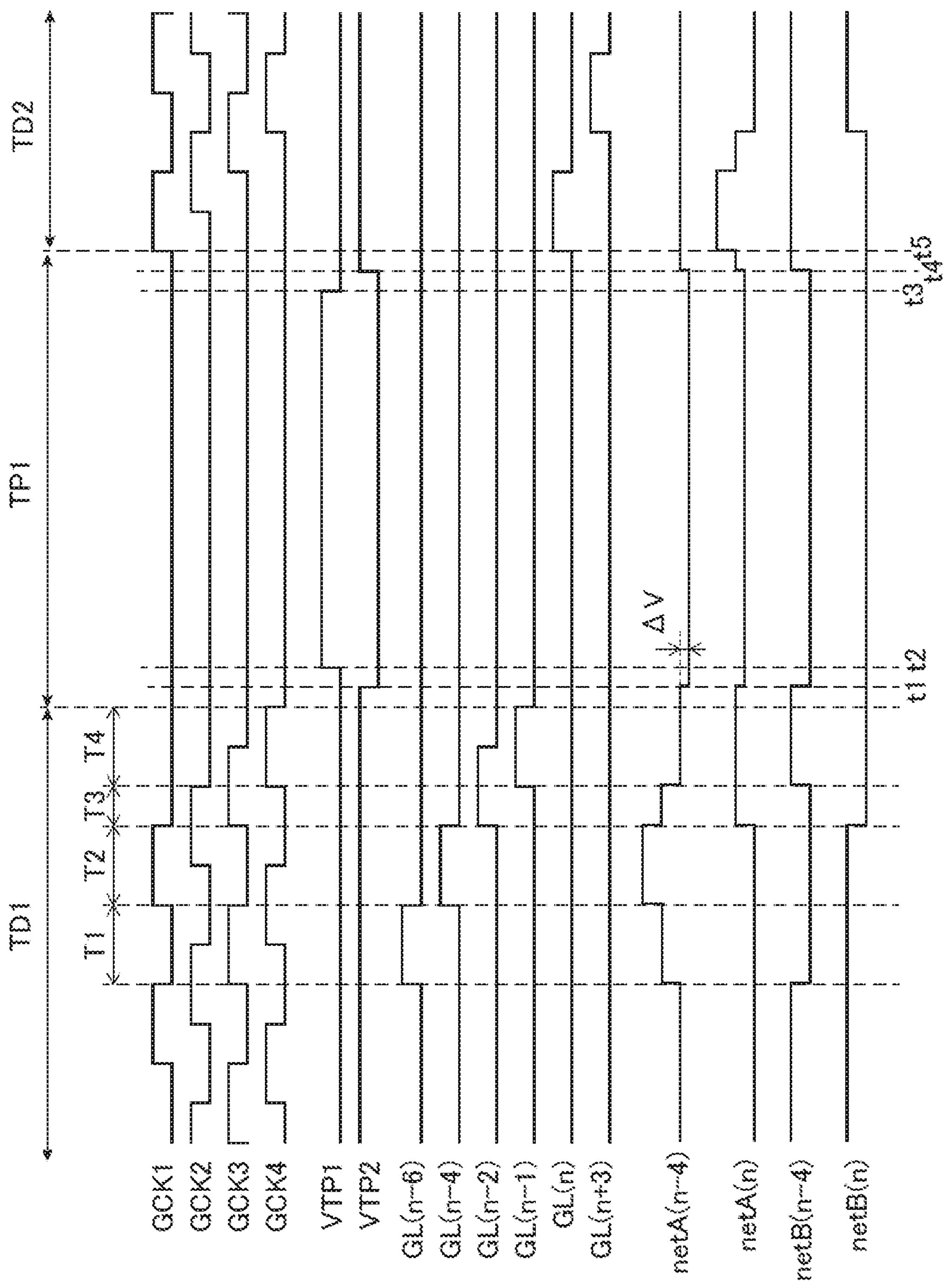
FIG. 14 is a timing chart when the shift register illustrated in FIG. 13 performs the driving.

FIG. 14 is a timing chart when the shift registers 341(*n*−4) and 341(*n*) corresponding to the gate lines GLn−4 and GLn, respectively, are driven. The following description mainly describes points different from those of the timing chart (FIG. 12) of Embodiment 4, regarding operations of the shift register 341(*n*−4).

As illustrated in FIG. 14, in the period T1 in the image display period TD, when the potential of netB(n−4) changes to the L level, netA(n−4) is precharged so as to have a potential of magnitude (VDD−Vth1). Subsequently, in the period T2, when the potential of the clock signal GCK1 changes to the H level, the potential of netA(n−4) is boosted up to a level higher than the potential during the precharging, via the capacitor Cbst, and a selection voltage is applied to the gate line GLn−4 via TFT_M5.

Subsequently, the clock signal GCK1 changes to the L level, and in the period T4, the potential of netA(n−4) changes to the L level via TFT_M3. At this time, the potential of netB(n−4) changes to the H level via TFT_M6.

Then, the touch position detection period TP starts, and when the potential of the signal VTP2 changes to the L level at time t1, the potential of netB(n−4) changes to the L level. At this time, the potential of netA(n−4) changes to a level ΔV lower than the L level via the capacitor Cb.

In this way, in Embodiment 5, the potential of netA of the shift register 341 does not decrease in association with the decrease of the potential of netB of the shift register, and this makes it possible to surely drive the corresponding gate line GL when the image display period is resumed. Further, when the touch position detection period starts, the potential of netA that is supposed to be kept at the L level can be caused to change to a further lower level via the capacitor Cb. This makes it possible to prevent malfunctions of TFT_M5 that are caused by an increase in the potential of netA due to off-leakage during the touch position detection period.

Examples of the display device according to the present invention are described above, but the display device of the present invention is not limited to the above-described embodiments, and the above-described embodiments can be appropriately varied. The following description describes modification examples thereof.

(1) Embodiment 3 is described above with reference to an example in which a capacitor Ca is provided between netA and netB, but the configuration may be such that the capacitor Ca is not provided, and a parasitic capacitance between TFT_M4 and netA in the shift register 331 may be used. In other words, in this case, by increasing the size of TFT_M4 or the like as compared with Embodiment 3, TFT_M4 is configured so that the parasitic capacitance between TFT_M4 and netA is equal to that in a case where the capacitor Ca is provided.

(2) In the above-described embodiments, the potentials of the clock signals GCK1 to GCK4 are controlled to the L level during the touch position detection period, but the configuration may be such that the supply of the clock signals GCK1 to GCK4 to the shift register may be suspended only during touch position detection period.

(3) In the above-described embodiments, semiconductor layers of TFT 11 for the pixels and TFTs used for the shift registers 301, 311, 321, 331, and 341 may be formed with amorphous silicon (a-Si), but it is preferable that oxide semiconductor is used.

Examples of the oxide semiconductor includes In (indium) -Ga (gallium) -Zn (zinc) -O (oxygen) -based ternary oxide. The ratio of In, Ga and Zn (composition ratio) is not limited particularly, but may be, for example, In:Ga:Zn=2:2:1, In:Ga:Zn=1:1:1, In:Ga:Zn=1:1:2, or the like. Further, the composition may contain, for example, In, Ga and Zn at a ratio of 1:1:1. TFT that has an In—Ga—Zn-based semiconductor layer has a higher mobility (more than 20 times) as compared with TFT formed with a-Si, and has lower leakage current (less than one hundredth) as compared with TFT formed with a-Si. Such TFT is therefore preferably used as TFTs for a shift register in particular. By using TFTs having an In—Ga—Zn—O-based semiconductor layer, leakage current in the shift register can be decreased, and electric power consumption of the display device can be drastically reduced.

Further, the In—Ga—Zn—O-based semiconductor may be amorphous, or may include a crystalline part thereby having crystallinity. As the crystalline In—Ga—Zn—O-based semiconductor, crystalline In—Ga—Zn—O-based semiconductor in which the c-axis is substantially vertically aligned with respect to the layer surface is preferred. The crystal structure of such an In—Ga—Zn—O-based semiconductor is disclosed in, for example, JP-A-2012-134475, the entirety of which is incorporated herein by reference.

The oxide semiconductor layer may contain another oxide semiconductor in place of the In—Ga—Zn—O-based semiconductor. The oxide semiconductor layer may contain, for example, Zn—O-based semiconductor (ZnO), In—Z—O-based semiconductor (IZO (registered trademark)), Zn—Ti—O-based semiconductor (ZTO), Cd—Ge—O-based semiconductor, Cd—Pb—O-based semiconductor, CdO (cadmium oxide), Mg—Zn—O-based semiconductor, In—Sn—Zn—O-based semiconductor (for example, $In_2O_3$—$SnO_2$—ZnO), In—Ga—Sn—O-based semiconductor, or the like.

(4) The above-described embodiments are described with reference to an exemplary case where the shift register is formed with n-channel-type TFTs, but the shift register may be formed with p-channel-type TFTs, or alternatively, it may be formed with both of n-channel-type TFTs and p-channel-type TFTs. In the case of the p-channel-type TFT, as the voltage applied to the gate electrode is lower, electric current more easily flows between the drain and the source. In the case where p-channel-type TFTs are used, therefore, the potential relationship in each embodiment is reverse to the potential relationship in the case where n-channel-type TFTs are used.

(5) The above-described embodiments are described with reference to an exemplary display device in which liquid crystal is used, but the configuration is not limited to this, as long as the display device has the image display function and the touch position detection function. For example, the display device may be such that, as is the case with the above-described embodiments, elements for touch position detection (the counter electrode 50, the signal line 51, and the like) are provided on a display panel in which organic electroluminescence (EL) is used.

DESCRIPTION OF REFERENCE NUMERALS

1: display device
2: active matrix substrate
3: counter substrate
4: liquid crystal layer
12: pixel electrode
20: source driver
30: gate driver
40: controller
50: counter electrode (common electrode)
51: signal line
301, 311, 321, 331, 341: shift register
R, R1, R2: reset circuit
GL: gate line
SL: source line

The invention claimed is:

1. A display device comprising:

a display panel including a plurality of gate lines; and a driving circuitry that includes a plurality of drive circuits that are provided in correspondence to the gate lines, respectively, so as to scan the gate lines sequentially, with use of a driving signal, wherein the driving circuitry alternately switches a scanning period in which the gate lines are scanned, and a non-scanning period in which the scanning of the gate lines is suspended, during one vertical scanning period, wherein each of the drive circuits includes:

an output switching element that, during the scanning period, applies a selection voltage to one of the gate lines corresponding thereto, the selection voltage causing this gate line to be switched to a selected state;

an internal line connected with a gate electrode of the output switching element; and a reset circuitry connected with the internal line, the internal line has a potential that changes between a first potential that is equal to or higher than a threshold voltage of the output switching element, and a second potential that is lower than the first potential, and in some drive circuits, among the drive circuits, wherein a period while the internal line thereof has the second potential overlaps with the non-scanning period, the reset circuit resets the potential of the internal line to the second potential, before the scanning period after the non-scanning period is resumed, wherein the reset circuitry includes:

a first reset switching element connected with the internal line;

a second reset switching element connected with the internal line and the first reset switching element;

a reset internal line connected with the second reset switching element; and a third reset switching element connected with the reset internal line, wherein the first reset switching element includes a gate electrode connected with the reset internal line, a source electrode connected with the internal line, and a drain electrode to which a control signal is supplied, the control signal having a potential higher than the second potential during a period after the start of the non-scanning period until the resumption of the scanning period after the non-scanning period, and having the second potential during a period other than the foregoing period, the second reset switching element includes a gate electrode connected with the internal line, and causes a potential of the reset internal line to change to a level lower than a threshold voltage of the first reset switching element, at least when the potential of the internal line is equal to or higher than a threshold voltage of the second reset switching element, and before the scanning period is resumed, the third reset switching element causes the potential of the reset internal line to change to a level equal to or higher than the threshold voltage of the first reset switching element.

2. The display device according to claim 1, wherein the third reset switching element causes the potential of the reset internal line to change to a level equal to or higher than the threshold voltage of the first reset switching element before the scanning period is resumed, and during a period while the potential of the control signal is the second potential, and the reset circuitry further includes an auxiliary reset circuit, wherein the auxiliary reset circuit includes:

a first auxiliary reset switching element that includes a source electrode connected with the internal line, and a drain electrode to which the control signal is supplied;

an auxiliary reset internal line connected with a gate electrode of the first auxiliary reset switching element;

a second auxiliary reset switching element connected with the internal line and the auxiliary reset internal line; and a third auxiliary reset switching element connected with the auxiliary reset internal line, wherein the second auxiliary reset switching element includes a gate electrode connected with the internal line, and at least when the potential of the internal line is equal to or higher than a threshold voltage of the second auxiliary reset switching element, the second auxiliary reset switching element causes the potential of the auxiliary reset internal line to change to a level lower than a threshold voltage of the first auxiliary reset switching element, and the third auxiliary reset switching element causes the potential of the auxiliary reset internal line to change to a level equal to or higher than the threshold voltage of the first auxiliary reset switching element, only before the scanning period is resumed, after the potential of the control signal changes to the second potential.

3. The display device according to claim 1, further comprising a control circuit that inputs the driving signal to the drive circuits, wherein the control circuit inputs the driving signal to the drive circuits during the scanning period, and suspends the input of the drive signal to the drive circuits during the non-scanning period.

4. The display device according to claim 1, wherein the switching elements used in the drive circuits and the reset circuits include a semiconductor layer formed with an oxide semiconductor.

5. The display device according to claim 4, wherein the oxide semiconductor contains indium, gallium, zinc, and oxygen.

6. A display device comprising:

a display panel including a plurality of gate lines; and a driving circuitry that includes a plurality of drive circuits that are provided in correspondence to the gate lines, respectively, so as to scan the gate lines sequentially, with use of a driving signal, wherein the driving circuitry alternately switches a scanning period in which the gate lines are scanned, and a non-scanning period in which the scanning of the gate lines is suspended, during one vertical scanning period, wherein each of the drive circuits includes:

an output switching element that, during the scanning period, applies a selection voltage to one of the gate lines corresponding thereto, the selection voltage causing this gate line to be switched to a selected state;

an internal line connected with a gate electrode of the output switching element; and a reset circuitry connected with the internal line, the internal line has a potential that changes between a first potential that is equal to or higher than a threshold voltage of the output switching element, and a second potential that is lower than the first potential, and in some drive circuits, among the drive circuits, wherein a period while the internal line thereof has the second potential overlaps with the non-scanning period, the reset circuit resets the potential of the internal line to the second potential, before the scanning period after the non-scanning period is resumed, wherein the reset circuitry includes:

a first reset switching element connected with the internal line;

a second reset switching element connected with the internal line and the first reset switching element;

a reset internal line connected with the second reset switching element;

a capacitor formed between the internal line and the reset internal line; and a third reset switching element connected with the reset internal line, wherein the first reset switching element includes a gate electrode connected with the reset internal line, a source electrode connected with the internal line, and a drain electrode to which a control signal is supplied, the control signal having a potential higher than the second potential during a period after the start of the non-scanning period until the resumption of the scanning period after the non-scanning period, and having the second potential during a period other than the foregoing period, the second reset switching element includes a gate electrode connected with the internal line, and causes a potential of the reset internal line to change to a level lower than a threshold voltage of the first reset switching element, at least when the potential of the internal line is equal to or higher than a threshold voltage of the second reset switching element, and before the scanning period is resumed, the third reset switching element causes the potential of the reset internal line to change to a level equal to or higher than the threshold voltage of the first reset switching element.

7. The display device according to claim 6, wherein the capacitor includes a pair of electrodes, and one of the electrodes of the capacitor is connected with the internal line, and the other electrode thereof is connected to the reset internal line.

8. A display device comprising:

a display panel including a plurality of gate lines; and a driving circuitry that includes a plurality of drive circuits that are provided in correspondence to the gate lines, respectively, so as to scan the gate lines sequentially, with use of a driving signal, wherein the driving circuitry alternately switches a scanning period in which the gate lines are scanned, and a non-scanning period in which the scanning of the gate lines is suspended, during one vertical scanning period, wherein each of the drive circuits includes:

an output switching element that, during the scanning period, applies a selection voltage to one of the gate lines corresponding thereto, the selection voltage causing this gate line to be switched to a selected state;

an internal line connected with a gate electrode of the output switching element; and a reset circuitry connected with the internal line, the internal line has a potential that changes between a first potential that is equal to or higher than a threshold voltage of the output switching element, and a second potential that is lower than the first potential, and in some drive circuits, among the drive circuits, wherein a period while the internal line thereof has the second potential overlaps with the non-scanning period, the reset circuit resets the potential of the internal line to the second potential, before the scanning period after the non-scanning period is resumed, wherein the reset circuitry includes:

a first reset switching element connected with the internal line;

a reset internal line connected with the first reset switching element;

a second reset switching element connected with the internal line and the reset internal line;

a third reset switching element connected with the reset internal line; and a capacitor connected with the internal line, wherein the first reset switching element includes a gate electrode connected with the reset internal line, a source electrode connected with the internal line, and a drain electrode to which a control signal is supplied, the control signal having a potential higher than the second potential during a period after the start of the non-scanning period until the resumption of the scanning period after the non-scanning period, and having the second potential during a period other than the foregoing period, the second reset switching element includes a gate electrode connected with the internal line, and causes a potential of the reset internal line to change to a level lower than a threshold voltage of the first reset switching element, at least when the potential of the internal line is equal to or higher than a threshold voltage of the second reset switching element, before the scanning period is resumed, the third reset switching element causes the potential of the reset internal line to change to a level equal to or higher than the threshold voltage of the first reset switching element, and the capacitor includes a pair of electrode, one of the electrodes is connected with the internal line, and to the other electrode, a potential higher than the second potential is supplied during the scanning period, and the second potential is supplied during the non-scanning period.

* * * * *